(12) United States Patent
Chang et al.

(10) Patent No.: US 11,795,102 B2
(45) Date of Patent: Oct. 24, 2023

(54) NON-CONTACT COATED GLASS AND RELATED COATING SYSTEM AND METHOD

(71) Applicant: Corning Incorporated, Corning, NY (US)

(72) Inventors: Theresa Chang, Painted Post, NY (US); Ming-Huang Huang, Ithaca, NY (US); Linda Gaskill, Painted Post, NY (US); Peter Joseph Lezzi, Corning, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 103 days.

(21) Appl. No.: 15/410,320

(22) Filed: Jan. 19, 2017

(65) Prior Publication Data

US 2017/0210666 A1 Jul. 27, 2017

Related U.S. Application Data

(60) Provisional application No. 62/287,186, filed on Jan. 26, 2016.

(51) Int. Cl.
*C03C 17/00* (2006.01)
*C03C 17/22* (2006.01)
(Continued)

(52) U.S. Cl.
CPC .......... *C03C 17/002* (2013.01); *C03C 17/009* (2013.01); *C03C 17/10* (2013.01);
(Continued)

(58) Field of Classification Search
CPC ......... C03C 17/10; C03C 17/22; C03C 17/25; C03C 17/256; C03C 17/3417
See application file for complete search history.

(56) References Cited

U.S. PATENT DOCUMENTS 2,145,119 A    1/1939  Littleton
2,177,336 A   10/1939  Shaver et al.
(Continued)

FOREIGN PATENT DOCUMENTS

AU    42657/72 A    11/1973
AU    05245/73 B2    9/1982
(Continued)

OTHER PUBLICATIONS

Koike et al.—Sub-critical crack growth rate of soda-lime-silicate glass and less brittle glass as a function of fictive temperature; Journal of Non-Crystalline Solids vol. 353 Issue 27 pp. 2675-2680; Jun. 2007 (Year: 2007).*

(Continued)

*Primary Examiner* — Humera N. Sheikh
*Assistant Examiner* — Elizabeth D Ivey
(74) *Attorney, Agent, or Firm* — Russell S. Magaziner

(57) ABSTRACT

A coated glass article and of a system and method for forming a coated glass article are provided. The process includes applying a first coating precursor material to the first surface of the glass article and supporting the glass article via a gas bearing. The process includes heating the glass article and the coating precursor material to above a glass transition temperature of the glass article while the glass article is supported by the gas bearing such that during heating, a property of the first coating precursor material changes forming a coating layer on the first surface of the glass article from the first precursor material. The high temperature and/or non-contact coating formation may form a coating layer with one or more new physical properties, such as a deep diffusion layer within the glass, and may form highly consistent coatings on multiple sides of the glass.

9 Claims, 11 Drawing Sheets

(51) Int. Cl.
*C03C 17/34* (2006.01)
*C03C 17/245* (2006.01)
*C03C 17/10* (2006.01)
*C03C 17/25* (2006.01)

(52) U.S. Cl.
CPC ............ *C03C 17/22* (2013.01); *C03C 17/225* (2013.01); *C03C 17/245* (2013.01); *C03C 17/25* (2013.01); *C03C 17/256* (2013.01); *C03C 17/3411* (2013.01); *C03C 17/3417* (2013.01); *C03C 2218/11* (2013.01)

(56) References Cited

U.S. PATENT DOCUMENTS

| | | |
|---|---|---|
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,449,102 A | 6/1969 | Nedelec et al. |
| 3,497,340 A | 2/1970 | Dennison et al. |
| 3,556,757 A * | 1/1971 | Kozlowski ............ C03C 21/002 |
| | | 134/2 |
| 3,558,415 A | 1/1971 | Rieser et al. |
| 3,607,169 A | 9/1971 | Coxe et al. |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,850,679 A | 11/1974 | Sopko et al. |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |
| 4,081,254 A | 3/1978 | Matsumoto et al. |
| 4,091,163 A | 5/1978 | Clausen |
| 4,107,460 A * | 8/1978 | Grunza ................... G10L 15/00 |
| | | 704/253 |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |
| 4,204,845 A | 5/1980 | Shields et al. |
| 4,214,886 A | 7/1980 | Shay et al. |
| 4,286,052 A * | 8/1981 | Ernsberger ................ G03F 1/54 |
| | | 427/457 |
| 4,300,936 A | 11/1981 | Quillevere et al. |
| 4,314,836 A | 2/1982 | Seymour |
| 4,319,907 A | 3/1982 | Pike |
| 4,372,774 A | 2/1983 | Cross et al. |
| 4,400,193 A | 8/1983 | Cross et al. |
| 4,470,838 A | 9/1984 | McMaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,690,871 A | 9/1987 | Gordon |
| 4,744,676 A | 5/1988 | Lind |
| 4,773,926 A | 9/1988 | Letemps et al. |
| 4,826,525 A | 5/1989 | Chesworth et al. |
| 4,913,720 A | 4/1990 | Gardon et al. |
| 4,985,275 A | 1/1991 | Takemura et al. |
| 5,009,694 A | 4/1991 | Nishitani et al. |
| 5,057,375 A | 10/1991 | Gordon |
| 5,121,329 A | 6/1992 | Crump |
| 5,213,440 A * | 5/1993 | Yeh ......................... C03C 3/095 |
| | | 404/14 |
| 5,236,488 A | 8/1993 | Vehmas |
| 5,285,517 A * | 2/1994 | Wu .......................... C03C 3/085 |
| | | 359/885 |
| 5,340,433 A | 8/1994 | Crump |
| 5,500,287 A * | 3/1996 | Henderson ............... B01J 13/02 |
| | | 428/336 |
| 5,626,911 A | 5/1997 | Bertin et al. |
| 5,643,649 A * | 7/1997 | Hagan ..................... C03B 32/00 |
| | | 65/117 |
| 5,654,057 A | 8/1997 | Kitayama et al. |
| 5,676,722 A | 10/1997 | Seidel et al. |
| 5,735,923 A | 4/1998 | Hisaeda |
| 5,795,659 A | 8/1998 | Meelu et al. |
| 5,885,316 A | 3/1999 | Sato et al. |
| 5,931,981 A | 8/1999 | McMaster et al. |
| 5,938,808 A | 8/1999 | McMaster et al. |
| 6,053,011 A | 4/2000 | Lisec |
| 6,079,227 A | 6/2000 | Yoshizawa et al. |
| 6,094,943 A | 8/2000 | Okuda et al. |
| 6,117,283 A | 9/2000 | Chen et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,306,848 B2 | 12/2007 | Tominaga et al. |
| 7,312,156 B2 | 12/2007 | Granneman et al. |
| 7,341,968 B2 | 3/2008 | Yoda et al. |
| 7,367,205 B1 | 5/2008 | Boaz |
| 7,410,355 B2 | 8/2008 | Granneman et al. |
| 7,566,673 B2 * | 7/2009 | Kawai ..................... C03C 3/091 |
| | | 501/69 |
| 7,694,532 B1 | 4/2010 | Boaz |
| 7,908,885 B2 | 3/2011 | Devitt |
| 8,074,473 B2 | 12/2011 | Nitschke et al. |
| 8,233,433 B2 | 7/2012 | Kalhan |
| 8,234,883 B2 | 8/2012 | Krall et al. |
| 8,289,342 B2 | 10/2012 | Matsumoto |
| 8,415,013 B2 | 4/2013 | Barefoot et al. |
| 8,524,804 B2 | 9/2013 | Kitano et al. |
| 8,585,463 B2 * | 11/2013 | Nakae ................. G11B 5/73921 |
| | | 438/693 |
| 8,713,967 B2 | 5/2014 | Danielson et al. |
| 8,713,972 B2 | 5/2014 | Lakota et al. |
| 8,728,961 B2 | 5/2014 | Lautenschlaeger et al. |
| 8,769,990 B2 | 7/2014 | Saito et al. |
| 8,776,548 B2 | 7/2014 | Dannoux et al. |
| 8,997,521 B2 | 4/2015 | Vehmas et al. |

(56) References Cited

U.S. PATENT DOCUMENTS

| | | | |
|---|---|---|---|
| 9,003,835 B2 | 4/2015 | Lock |
| 9,073,291 B2 | 7/2015 | Bookbinder et al. |
| 9,296,638 B2 | 3/2016 | Lezzi et al. |
| 9,478,449 B2 | 10/2016 | Vermont et al. |
| 9,522,836 B2 | 12/2016 | Gulati et al. |
| 9,552,836 B2 | 1/2017 | Ramakrishnan et al. |
| 9,725,359 B2 | 8/2017 | Weber |
| 9,761,828 B2 | 9/2017 | Dabich et al. |
| 9,776,905 B2 | 10/2017 | Maschmeyer et al. |
| 9,783,448 B2 | 10/2017 | Maschmeyer et al. |
| 9,802,853 B2 | 10/2017 | Maschmeyer et al. |
| 10,195,778 B2 | 2/2019 | Wolf et al. |
| 2001/0007723 A1 | 7/2001 | Tokumoto |
| 2002/0011481 A1* | 1/2002 | Melson ............... C03C 10/00 219/452.11 |
| 2003/0177790 A1 | 9/2003 | Langsdorf et al. |
| 2004/0107733 A1 | 6/2004 | Yashizawa |
| 2005/0099618 A1 | 5/2005 | DiFoggio et al. |
| 2005/0138892 A1 | 6/2005 | Misonou |
| 2005/0266247 A1 | 12/2005 | Yoshizawa |
| 2006/0054774 A1 | 3/2006 | Yassour et al. |
| 2006/0121281 A1 | 6/2006 | Tamai et al. |
| 2006/0179722 A1 | 8/2006 | Spindler |
| 2006/0219605 A1 | 10/2006 | Devitt |
| 2007/0122580 A1 | 5/2007 | Krall et al. |
| 2007/0271957 A1 | 11/2007 | Nakamura et al. |
| 2008/0314403 A1 | 12/2008 | Rebours |
| 2009/0092472 A1 | 4/2009 | Luo et al. |
| 2009/0220761 A1 | 9/2009 | Dejneka et al. |
| 2010/0035038 A1 | 2/2010 | Barefoot et al. |
| 2010/0130251 A1 | 5/2010 | Chu |
| 2010/0162761 A1 | 7/2010 | Carney et al. |
| 2010/0183767 A1 | 7/2010 | Noordam et al. |
| 2010/0279068 A1 | 11/2010 | Cook et al. |
| 2011/0123833 A1 | 5/2011 | Endo et al. |
| 2011/0200804 A1 | 8/2011 | Tomamoto et al. |
| 2011/0281093 A1 | 11/2011 | Gulati et al. |
| 2011/0289971 A1 | 12/2011 | Brown et al. |
| 2011/0289972 A1 | 12/2011 | Brown et al. |
| 2012/0144867 A1 | 6/2012 | Busch |
| 2012/0145991 A1 | 6/2012 | Nam et al. |
| 2012/0194974 A1 | 8/2012 | Weber et al. |
| 2012/0247063 A1 | 10/2012 | Grzybowski et al. |
| 2012/0258250 A1 | 10/2012 | Rodgers |
| 2012/0291707 A1 | 11/2012 | Granneman |
| 2013/0008500 A1 | 1/2013 | Lin et al. |
| 2013/0019639 A1 | 1/2013 | Saito et al. |
| 2013/0047673 A1 | 2/2013 | Lee et al. |
| 2013/0052347 A1 | 2/2013 | Kuznetsov et al. |
| 2013/0059120 A1* | 3/2013 | Shi ..................... C08J 7/043 977/773 |
| 2013/0065795 A1* | 3/2013 | Allbritton ............. C12M 23/22 506/40 |
| 2013/0071666 A1 | 3/2013 | Komori et al. |
| 2013/0122284 A1 | 5/2013 | Gross |
| 2013/0122313 A1 | 5/2013 | Gross |
| 2013/0199448 A1 | 8/2013 | Granneman et al. |
| 2013/0255314 A1 | 10/2013 | Allan et al. |
| 2013/0291598 A1* | 11/2013 | Saito ................. B23K 26/0732 65/112 |
| 2013/0323444 A1 | 12/2013 | Ehemann et al. |
| 2014/0010992 A1* | 1/2014 | Rendon Granados ..................... B65G 49/062 428/141 |
| 2014/0026622 A1 | 1/2014 | Wang |
| 2014/0050912 A1 | 2/2014 | Isono et al. |
| 2014/0053605 A1 | 2/2014 | Mader |
| 2014/0065401 A1 | 3/2014 | Donovan et al. |
| 2014/0113854 A1 | 4/2014 | Ni et al. |
| 2014/0120279 A1 | 5/2014 | Demartino et al. |
| 2014/0141217 A1 | 5/2014 | Gulati et al. |
| 2014/0162000 A1 | 6/2014 | Son et al. |
| 2014/0178663 A1* | 6/2014 | Varshneya ............ C03C 21/002 428/220 |
| 2014/0242391 A1 | 8/2014 | Ono et al. |
| 2014/0290310 A1 | 10/2014 | Green |
| 2014/0352355 A1 | 12/2014 | Boudreau et al. |
| 2014/0370303 A1 | 12/2014 | Jin et al. |
| 2015/0027169 A1 | 1/2015 | Fredholm |
| 2015/0030827 A1 | 1/2015 | Gomez et al. |
| 2015/0031752 A1 | 1/2015 | Keil et al. |
| 2015/0037552 A1 | 2/2015 | Mauro |
| 2015/0052949 A1 | 2/2015 | Bayne et al. |
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158757 A1 | 6/2015 | Amma et al. |
| 2015/0218045 A1 | 8/2015 | Balcom et al. |
| 2015/0251353 A1 | 9/2015 | Rodgers et al. |
| 2015/0274015 A1 | 10/2015 | Wachinger et al. |
| 2015/0307385 A1 | 10/2015 | Klein et al. |
| 2015/0343704 A1 | 12/2015 | Stahl et al. |
| 2015/0368153 A1 | 12/2015 | Pesansky et al. |
| 2016/0002103 A1 | 1/2016 | Wang et al. |
| 2016/0031741 A1 | 2/2016 | Maschmeyer et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0281233 A1 | 9/2016 | Granneman et al. |
| 2016/0326051 A1 | 11/2016 | Kim |
| 2017/0072613 A2 | 3/2017 | Bracha et al. |
| 2017/0158543 A1 | 6/2017 | Metz et al. |
| 2017/0233287 A1* | 8/2017 | Li ..................... C03C 3/087 428/172 |
| 2017/0361574 A1 | 12/2017 | Kiczenski et al. |
| 2018/0210308 A1 | 7/2018 | Lam et al. |
| 2018/0304588 A1 | 10/2018 | Harris et al. |
| 2019/0030861 A1 | 1/2019 | Bellman et al. |
| 2019/0227357 A1 | 7/2019 | Williams et al. |
| 2019/0270284 A1 | 9/2019 | Couillard et al. |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1896020 A | 1/2007 |
| CN | 101312919 A | 11/2008 |
| CN | 101671112 A | 3/2010 |
| CN | 101774751 A | 7/2010 |
| CN | 102149649 A | 8/2011 |
| CN | 102659305 A | 9/2012 |
| CN | 102863146 A | 1/2013 |
| CN | 103253857 A | 8/2013 |
| CN | 103319082 A | 9/2013 |
| CN | 103359934 A | 10/2013 |
| CN | 103781733 A | 5/2014 |
| CN | 103827051 A | 5/2014 |
| CN | 104211288 A | 12/2014 |
| CN | 104260569 A | 1/2015 |
| CN | 104310773 A | 1/2015 |
| CN | 104355530 A | 2/2015 |
| CN | 104479282 A | 4/2015 |
| CN | 104583141 A | 4/2015 |
| CN | 205275454 U | 6/2016 |
| CN | 106045283 A | 10/2016 |
| DE | 2233057 A1 | 3/1973 |
| EP | 0173418 A2 | 3/1986 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2853517 A1 | 4/2015 |

(56) References Cited

FOREIGN PATENT DOCUMENTS

| | | |
|---|---|---|
| FR | 2326386 A1 | 4/1977 |
| GB | 0996423 A | 6/1965 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 | 5/2005 |
| IN | 200803022 | 8/2008 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 07-089739 A | 4/1995 |
| JP | 07-809739 A | 4/1995 |
| JP | 07-157322 A | 6/1995 |
| JP | 07-267664 A | 10/1995 |
| JP | 11-199257 A | 7/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001-307662 A | 11/2001 |
| JP | 2003-040635 A | 2/2003 |
| JP | 2003-137603 A | 5/2003 |
| JP | 2003-261344 A | 9/2003 |
| JP | 2003-342030 A | 12/2003 |
| JP | 2004-091311 A | 3/2004 |
| JP | 2007-191319 A | 8/2007 |
| JP | 2007-261850 A | 10/2007 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 5334005 B2 | 11/2013 |
| JP | 2015-086080 A | 5/2015 |
| JP | 5714701 B2 | 5/2015 |
| KR | 10-0218143 B1 | 9/1999 |
| KR | 10-2002-0061567 A | 7/2002 |
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 10-2014-0110364 A | 9/2014 |
| KR | 10-2014-0135846 A | 11/2014 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| SU | 443845 A1 | 9/1974 |
| SU | 537960 A1 | 12/1976 |
| SU | 548188 A1 | 9/1982 |
| SU | 1098916 A1 | 6/1984 |
| SU | 1655920 A1 | 6/1991 |
| WO | 90/03337 A1 | 4/1990 |
| WO | 99/44952 A1 | 9/1999 |
| WO | 01/16040 A1 | 3/2001 |
| WO | 02/16277 A1 | 2/2002 |
| WO | 03/14035 A1 | 2/2003 |
| WO | 2006/083902 A1 | 8/2006 |
| WO | 2006/110145 A1 | 10/2006 |
| WO | 2008/020509 A1 | 2/2008 |
| WO | 2008/147558 A1 | 12/2008 |
| WO | 2010/076903 A1 | 7/2010 |
| WO | 2011/122678 A1 | 10/2011 |
| WO | 2012/082709 A1 | 6/2012 |
| WO | 2012/125857 A1 | 9/2012 |
| WO | 2012/142629 A1 | 10/2012 |
| WO | 2013/016157 A1 | 1/2013 |
| WO | 2014/030682 A1 | 2/2014 |
| WO | 2014024583 A1 | 2/2014 |
| WO | 2014/060108 A2 | 4/2014 |
| WO | 2014/139147 A1 | 9/2014 |
| WO | 2014/182776 A1 | 11/2014 |
| WO | 2014/201315 A1 | 12/2014 |
| WO | 2015/031148 A1 | 3/2015 |
| WO | 2015/031594 A2 | 3/2015 |
| WO | 2015/033562 A1 | 3/2015 |
| WO | 2016/019171 A1 | 2/2016 |
| WO | WO-2016037793 A1 * | 3/2016 ............ C03C 3/091 |
| WO | 2016/057590 A1 | 4/2016 |
| WO | 2017/019837 A1 | 2/2017 |
| WO | 2017/020041 A1 | 2/2017 |
| WO | 2017/071911 A1 | 5/2017 |
| WO | 2021/025981 A1 | 2/2021 |

OTHER PUBLICATIONS

Properties of Soda -Lime Silica Float Glass Technical Bulletin; NSG; Group; Pilkington North America , Inc. Jan. 14, 2013 (Year: 2013).*

Young Modulus of the elements; Wolfram Research Inc.; http://periodictable.eom/Properties/A/YoungModulus.v.html; printed Mar. 7, 2019 (Year: 2019).*

"Effects of ion exchange on the Young's modulus of glass"; John D. Mackenzie, J. Wakaki; Journal of Non-crystalline Solids; vols. 38-39, Part 1 May-Jun. 1980, pp. 385-390 (Year: 1980).*

Gross et al. "A glass with high crack initiation load: Role of fictive temperature-independent mechanical properties"; Journal of Non-crystalline Solids 355 (2009) pp. 563-568 (Year: 2009).*

WO-2016037793-A1—Bib Dta (Year: 2016).*

Glass Unlimited "AGC Technical Data Sheet Planibel". ; Nov. 2011 (Year: 2011).*

International Search Report and Written Opinion PCT/US2017/014857 dated Apr. 10, 2017.

Maschmeyer et al.; U.S. Appl. No. 62/236,296, filed Oct. 2, 2015; pp. 1-105.

De Grauw, C. J. et al., "Axial resolution of confocal Raman microscopes: Gaussian beam theory and practice," Journal of Microscopy, vol. 188, Pl. 3, Dec. 1997, pp. 273-279.

Deschamps, T. et al., "Soda-lime silicate glass under hydrostatic pressure and indentation: a micro-Raman study," Abstract, 2011, 1 page.

(56) References Cited

OTHER PUBLICATIONS

Deschamps, T. et al., "Soda-lime silicate glass under hydrostatic pressure and indentation: a micro-Raman study," Journal of Physics: Condensed Matter, vol. 23, 2011, 7 pages.
Donald, I. W., "Review: Methods for improving the mechanical properties of oxide glasses," Journal of Materials Science, vol. 24, 1989, pp. 4177-4208.
Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.
English Translation of CN104211288A, Performed by Phoenix Translations Jun. 2016.
Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.
Ernsberger, F. M., "Chapter 4: Techniques of Strengthening Glasses," In "Glass: Science and Technology," vol. 5, Elasticity and Strength in Glasses, Academic Press, Inc., May 28, 1980, pp. 133-144.
European Patent Application No. 15757030 Office Action dated Jun. 23, 2021; 5 Pages; European Patent Office.
European Patent Application No. 15757030.0 Office Action dated Mar. 2, 2018; 5 Pages; European Patent Office.
European Patent Application No. 16750337.4 Office Action dated Jan. 24, 2020; 4 Pages; European Patent Office.
EUROPTEC; "Themal Tempering"; EUROPTEC GMBH, DIC, Jun. 11, 2014; www.europtec.de.
Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.
Everall, Neil J., "Confocal Raman Microscopy: Why the Depth Resolution and Spatial Accuracy Can be Much Worse then You Think," Applied Spectroscopy, vol. 54, No. 10, 2000, pp. 1515-1520.
Fajans, Kasimir et al., "Properties and Structures of Vitreous and Crystalline Boron Oxide," Journal of the American Chemical Society, vol. 74, No. 11, Jun. 5, 1952, pp. 2761-2768.
Fotheringham, Dr. Ulrich, "Lecture 1: Internet teaching set-up," IMI-NFG's MITT Course on Relaxation Processes in Glass and Polymers Lecture 1, 2010, 6 slides.
Fotheringham, Dr. Ulrich, "Lecture 2: Phenomenology of viscoelasticity & glass transition," IMI-NFG's MITT Course on Relaxation Processes in Glass and Polymers Lecture 2, 2010, 17 slides.
Fotheringham, Dr. Ulrich, "Lecture 5: Viscoelasticity I—Shear," IMI-NFG's MITT Course on Relaxation Processes in Glass and Polymers Lecture 5, 2010, 19 slides.
Fotheringham, Dr. Ulrich, "Lecture 6: Viscoelasticity II—Bulk Viscoelasticity," IMI-NFG's MITT Course on Relaxation Processes in Glass and Polymers Lecture 6, 2010, 16 slides.
Fotheringham, Dr. Ulrich, "Lecture 7: Viscoelasticity III—Dynamic Testing," IMI-NFG's MITT Course on Relaxation Processes in Glass and Polymers Lecture 7, 2010, 19 slides.
Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.
Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.
Frick, B. et al., "The Microscopic Basis of the Glass Transition in Polymers from Neutron Scattering Studies," Science, vol. 267, Mar. 31, 1995, pp. 1939-1945.
Galeener, Frank L., "Raman and ESR Studies of the Thermal History of Amorphous $SiO_2$," Journal of Non-Crystalline Solids, vol. 71, 1985, pp. 373-386.
Gang, Zhang Ming, "Manufacturing and Properties of Glass Used in Construction," Guangdong Golden Glass Technologies Ltd, Dec. 27, 2002, 11 pages.

Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Glass, Jill et al., "Processing and Properties of Ion Exchanged Glasses," Glass and Optical Materials Division Fall Meeting, Nov. 6-12, 2004, Cape Canaveral, FL, 33 slides.
Glass, S. J. et al., "Stressed Glass Technology for Actuators and Removable Barrier Applications," Sandia Report SAND2007-4106, Sandia National Laboratories, Jul. 2007, 18 pages.
Gomez, Sinue et al., "69.2: Designing Strong Glass for Mobile Devices," SID Symposium Digest of Technical Papers, vol. 40, No. 1, Jan. 2009, pp. 1045-1048.
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, Suresh T., "Frangibility of Tempered Soda-Lime Glass Sheet," Glass Processing Days, Sep. 13-15, 1997, pp. 72-76.
Gupta, Prabhat K. et al., "The laboratory glass transition," The Journal of Chemical Physics, vol. 126, 2007, 9 pages.
Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., Ltd., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, , No. 5206, Mar. 31, 1995, pp. 1945-1947.
Hrma et al; "Thermal Healing of Cracks in Glass"; Journal of Non-Crystalline Solids; vol. 102, (1988); pp. 88-94.
Huang, Liping et al., "Polyamorphic transitions in vitreous $B_2O_3$ under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Hutchins, J. and R. Harrington, "Glass", Kirk-Othmer Encyclopedia of Chemical Technology, 2nd Edition, 10 pp. 533-604.
International Preliminary Report on Patentability of the International Searching Authority; PCT/US15/42955; dated Feb. 9, 2017; 9 Pages; European Patent Office.
International Preliminary Report on Patentability of the International Searching Authority; PCT/US16/45022; dated Feb. 8, 2018; 15 Pages; European Patent Office.
International Search Report and Writien Opinin PCT/US2016/044401 dated Jan. 2, 2017.
Aben, H. et al., "2.7 Stresses Due to Heterogeneities," Photoelasticity of Glass, Springer-Verlag, New York, 1993, 260 pages.
Acloque, P., "Influence of Strain-Systems in Glass upon the Course of its Fracture," Proceedings of the 4th International Glass Congress, vol. 6, 1965, pp. 279-291.

(56) References Cited

OTHER PUBLICATIONS

Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.
Agarwal, Anand et al., "A simple IR spectroscopic method for determining fictive temperature of silica glasses," Journal of Non-Crystalline Solids, vol. 185, 1995, pp. 191-198.
Agarwal, Anand et al., "Determination of Fictive Temperature of Soda-Lime Silicate Glass," Journal of the American Ceramic Society, vol. 78, No. 3, Mar. 1995, pp. 827-829.
Akeyoshi, K. et al., "Mechanical Properties of Tempered Glass," Proceedings of the 7th International Glass Congress, vol. 14, 1965, pp. 80-85.
Alexiades, V. et al., "The New Way/Glaston Problem," 28th Annual Workshop on Mathematical Problems in Industry, University of Delaware, Jun. 2012, 30 slides.
Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.
Aronen, Antti et al., "Tempering of Thin Glass," Glasstec 2012: Engineered Transparency, Oct. 25-26, 2012, pp. 145-153.
Author Unknown, "Application Note AN 527: Depth profiling of complex samples using confocal Raman microscopy," Bruker Optics Inc., 2012, 3 pages.
Author Unknown, "Architectural ERH2," Architectural Glass Systems, Glasstech, Inc., 2011, 2 pages.
Author Unknown, "Architectural FCH2(Trademark)," Architectural Glass Systems, Glasstech, Inc., 2011, 2 pages.
Author Unknown, "Corning(Registered) Gorilla(Trademark) Glass," Corning Incorporated, 2009, 2 pages.
Author Unknown, "Glass Strengthening Methods,"Abrisa Technologies, Apr. 2015, 2 pages.
Author Unknown, "Heat Treated Glass for Architectural Glazing," Glass Technical Document: TD-138, PPG Glass Technology, PPG Industries, Inc., Nov. 2011, 8 pages.
Author Unknown, "Introducing-Glasstech CRB-S.TM. 1900 for Solar Parabolic Shapes/" Solar Glass Systems, Glasstech, Inc., Date Unknown, 1 page, Retrieved Jul. 1, 2015.
Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http:/fwww.sizes.com/units/scratch_and_dig.him.
Author Unknown, "Solar FCH-S(Trademark)," Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.
Author Unknown, "Standard Specification for Heat-Treated Flat Glass—Kind HS, Kind FT Coated and Uncoated Glass," Designation: C 1048-4, ASTM International Standard, 2009, 7 pages.
Author Unknown, "Subject Index," Date Unknown, pp. 277-282.
Author Unknown, "Thermal Tempering," EuropTec GmbH, Nov. 6, 2014, 2 pages.
Author Unknown, "Unsteady Heat Transfer-HT3: Experimental Studies of Thermal Diffusivities and Heat Transfer Coefficients," Date Unknown, 27 slides.
Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.
Baldwin, K. J. et al., "Confocal Raman Microspectroscopy through a Planar Interface," Applied Spectroscopy, vol. 55, No. 5, 2001, pp. 517-524.
Bandyopadhyay et al; "Application of Fused Deposition in Controlled Microstructure Metal-Ceramic Composites", Rapid Prototyping Journal, vol. 12 Issue 3, pp. 121-128 (2006).
Barr, J. W., "Glass Tempering by Numbers," Aug. 2008, 8 pages.
Barr, Jonathan W., "The Tempering Process," Cardinal Waxachachie Tempering Seminar, Mar. 26, 2008, 36 slides.
Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
CN101671112A English Translation Performed by USPTO Translations Service Center Apr. 2017.
Conradt, Reinhard, "I. Fragility and its Relation to Other Glass Properties," IMI-NFG's MITT Course on Relaxation Processes in Glass Lecture 21, Apr. 6-8, 2010, 61 slides.
Conradt, Reinhard, "II. Networks," IIMI-NFG's Min Course on Relaxation Processes in Glass Lecture 22, Apr. 6-8, 2010, 61 slides.
Conway, Jr., Joseph C. et al., "Use of Crack Branching Data for Measuring Near-Surface Residual Stresses in Tempered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.
Danishkin, G. K. et al., "Development of a Continuous Method of Bending and Toughening Glass," Glass and Ceramics, vol. 34, Issue 8, Aug. 1977, pp. 495-498.
Daudeville, L. et al., "Numerical Simulation of Soda-Lime Silicate Glass Tempering," Journal de Physique IV, France, vol. 6, No. C1, Jan. 1996, pp. C1-175-C1-185.
Daudeville, Laurent et al., "Thermal Tempering Simulation of Glass Plates: Inner and Edge Residual Stresses," Journal of Thermal Stresses, vol. 21, 1998, pp. 667-689.
International Search Report and Writen Opinion PCT/US2016/044445 dated Oct. 14, 2016.
International Search Report and Writen Opinion PCT/US2016/045022 dated Jan. 31, 2017.
International Search Report and Written Opinin PCT/US2016/044401 dated Jan. 2, 2017.
International Search Report and Written Opinion of the International Searching Authority; PCT/US15/42955; dated Nov. 4, 2015; 10 Pages; European Patent Office.

(56) References Cited

OTHER PUBLICATIONS

International Search Report and Written Opinion of the International Searching Authority; PCT/US16/45022; dated Jan. 31, 2017; 20 Pages; European Patent Office.
International Search Report and Written Opinion of the International Searching Authority; PCT/US2016/044406; dated Nov. 25, 2016; 15 Pages; European Patent Office.
International Search Report and Written Opinion of the International Searching Authority; PCT/US2020/062128; dated Mar. 15, 2021; 9 pages; European Patent Office.
International Search Report and Written Opinion of the International Searching Authority; PCT/US2020/062145 dated Mar. 16, 2021, 11 pages; Korean Patent Office.
International Search Report and Written Opinion PCT/US2015/042955 dated Nov. 4, 2015.
International Search Report and Written Opinion PCT/US2015/042965 dated Nov. 2, 2015.
International Search Report and Written Opinion PCT/US2016/044406 dated Nov. 25, 2016.
Ito, Setsuro, "Brittleness and Nano-Structure of Glass," 4th International Workshop on Flow and Fracture of Advanced Glasses Presentation, Nov. 5-7, 2007, Shiga, Japan, 37 slides.
Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 2: Universal dielectric response (UDR)," IMI-NFG's MITT Course on Relaxation Processes in Glass Lecture 24, Advanced Vitreous State, The Properties of Glass: Dielectric Properties—Lecture 1, 2010, 22 slides.
Jain, Himanshu, "Electrical Relaxation—Topic 3: Nearly constant loss-second universality," IMI-NFG's MITT Course on Relaxation Processes in Glass Lecture 25, Advanced Vitreous State, The Properties of Glass: Dielectric Properties—Lecture 3, 2010, 24 slides.
Karlsson, Stefan et al., "The technology of chemical glass strengthening—a review," Glass Technology, European Journal of Glass Science Technology Part A, vol. 51, No. 2, Apr. 2010, pp. 41-54.
Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.
Kiefer, Werner et al., "Method for Thermal Prestressing of Glass," Strength of Inorganic Glass, Plenum Press, New York, 1985, pp. 501-511.
Kishii, Toru, "Surface Stress Meters Utilising the Optical Waveguide Effect of Chemically Tempered Glasses," Optics and Lasers in Engineering, vol. 4, 1983, pp. 25-38.
Kistler, S. S., "Stresses in Glass Produced by Nonuniform Exchange of Monovalent Ions," Journal of the American Ceramic Society, vol. 45, No. 2, Feb. 1962, pp. 59-68.
Klein et al; "Additive Manufacturing of Optically Transparent Glass"; 3D Printing and Additive Manufacturing; vol. 2, No. 3; 2015; pp. 92-105.
Koike, A. et al., "Fictive temperature dependence of subcritical crack growth rate of normal glass and anomalous glass," Journal of Non-Crystalline Solids, vol. 352, 2006, pp. 5522-5530.
Kong, Jinhak et al., "Residual Stress Analysis with Improved Numerical Methods for Tempered Plate Glasses Based on Structural Relaxation Model," Metals and Materials International, vol. 13, No. 1, 2007, pp. 67-75.
Lathabai, Srinivasarao et al., "Fracture mechanics model for sub-threshold indentation flaws: Part 1—Equilibrium fracture," Journal of Materials Science, vol. 26, 1991, pp. 2157-2168.
Lee, Hoikwan et al., "Glass Thickness and Fragmentation Behavior in Stressed Glasses," New Journal of Glass and Ceramics, vol. 2, 2012, pp. 138-143.
Lezzi, P. J. et al., "Confirmation of thin surface residual compressive stress in silica glass fiber by FTIR reflection spectroscopy," Journal of Non-Crystalline Solids, vol. 390, 2014, pp. 13-18.

Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Loucks, "Lecture 13: The Fictive and Glass Transition Temperatures," IMI-NFG's Min Course on Relaxation Processes in Glass Lecture 13, Mar. 2, 2010, 25 Slides.
Loucks, "Lecture 15: The Tool-Narayanaswamy-Moynihan Equation Part II and DSC," IMI-NFG's MITT Course on Relaxation Processes in Glass Lecture 15, Mar. 9, 2010, 33 Slides.
Loucks, Dr. Roger, "Lecture 14: Relaxation and the Tool-Narayanaswamy-Moynihan Equation," IMI-NFG's MITT Course on Relaxation Processes in Glass Lecture 14, Mar. 4, 2010, 27 slides.
Loucks, Dr. Roger, "Lecture 16: The Tool-Narayanaswamy-Moynihan Equation Part II and DSC," IMI-NFG's MITT Course on Relaxation Processes in Glass Lecture 16, Mar. 11, 2010, 32 slides.
Luo et al; "Additive Manufacturing of Glass for Optical Applications"; Proc. of SPIE, vol. 9738, 2016; pp. 97380Y-1-97380Y-9.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 11: Thermodynamics in the Glass Transition Region," IMI-NFG's MITT Course on Relaxation Processes in Glass Lecture 11, 2010, 22 slides.
Martin, Dr. Steve, "Lecture 12: The Glass Transition as a Kinetic Transition," IMI-NFG's Min Course on Relaxation Processes in Glass Lecture 12, 2010, 21 slides.
Martin, Dr. Steve, "Lecture 9: Thermodynamic Concepts and the Law of Thermodynamics," IMI-NFG's Min Course on Relaxation Processes in Glass Lecture 9, 2010, 32 slides.
Massen, Claire P. et al., "Power-law distributions for the areas of the basins of attraction on a potential energy landscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.
McMaster, Ronald A. et al., "Annealed and Tempered Glass," Engineered Materials Handbook, vol. 4, Ceramics and Glasses, 1991, 9 pages.
McMaster, Ronald A., "Flat Glass Tempering—How II Works," Glass Industry, Jun. 1989, pp. 10-15.
McMaster, Ronald A., "Fundamentals of Tempered Glass," Proceedings of the 49th Conference on Glass Problems Ceramic Engineering and Science Proceedings, vol. 10, Issue 3/4, 1989, pp. 193-206.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.
Mognato, Ennio et al., "Thermally toughened safety glass," Glass on Web, Last Reviewed: Jul. 2011, 9 pages, http://www.glassonweb.com/articles/article/727/.
Moynihan, C. T. et al., "Structural Relaxation in Vitreous Materials," Annals of the New York Academic of Sciences, vol. 279, Oct. 1976, pp. 15-35.
Narayanaswamy, 0. S. et al., "Calculation of Residual Stresses in Glass," Journal of the American Ceramic Society, vol. 52, No. 10, Oct. 1969, pp. 554-558.
Narayanaswamy, O. S., "Stress and Structural Relaxation in Tempering Glass," Journal of the American Ceramic Society, vol. 61, No. 3-4, Mar.-Apr. 1978, pp. 146-152.
Oakley, David R., "Crack branching in float glass subjected to biaxial loading," Journal of Non-Crystalline Solids, vol. 196, 1996, pp. 139-143.
Ohlberg, S.M. et al., "Thermal Stress Calculations Based on a Linear Viscoelastic Deviatoric Response and a Fictive Temperature

(56) References Cited

OTHER PUBLICATIONS

Component for the Volumetric Response," Journal of Non-Crystalline Solids, vol. 14, 1974, pp. 280-286.
Paschel, Richard, "History of the Safety Glazing Certification Council," Safety Glazing Certification Council, Date Unknown, 11 pages.
Ray, N. H. et al., "Increasing the strength of glass by treatment in molten salts," Physics and Chemistry of Glasses, vol. 8, No. 1, Feb. 1967, pp. 30-34.
Rekhson, S. M., "Chapter 1: Viscoelasticity of Glass," In "Glass: Science and Technology," vol. 3, 1986, 117 pages.
Rekson, S. M., "Structural Relaxation and Shear Stresses in the Glass-Transition Region," Soviet Journal of Glass Physics and Chemistry, 1975, pp. 417-421.
Sastry, Srikanth, "The relationship between fragility, configurational entropy and the potential energy landscape of glass-forming liquids," Nature, vol. 409, Jan. 11, 2001, pp. 164-167.
Scherer, George W., "Use of the Adam-Gibbs Equation in the Analysis of Structural Relaxation," Journal of the American Ceramic Society, vol. 67, No. 7, Jul. 1984, pp. 504-511.
Sciortino, Francesco, "Potential energy landscape description of supercooled liquids and glasses," Journal of Statistical Mechanics: Theory and Experiment, May 31, 2005, 35 pages.
Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.
Setsuro, Ito et al., "Processing Technical Books to the Glass High-Functions," Chapter 3: Sections 2.5, 3, 3.1, 3.2 & 3 3, Science & Technology Co., Ltd., Sep. 27, 2012, pp. 58-65.
Sglavo, V., A. Prezzi, M. Alessandrini, "Processing of Glasses with Engineered Stress Profiles," Journal of Non-Crystalline Solids, 344 (2004), 73-78.
Shelby "Introduction to Glass Science and Technology"; The Royal Chemical Society, 2nd Edition, 2005; p. 193.
Shimodaira, N. et al., "Raman spectra of fluorine-doped silica glasses with various fictive temperatures," Journal of Applied Physics, vol. 91, No. 6, Mar. 15, 2002, pp. 3522-3525.
Shinkai, Norihiko et al., "Indentation Fracture of Tempered Glasses," Reports of the Research Laboratory, Asahi Glass Co., Ltd., vol. 23, No. 2, 1973, pp. 83-99.
Shouyuan, Zhai et al., "Influence of Temperature and Time on Glass Strength During Chemical Tempering," [8J Journal of Shangdong Institute of Light Industry (Natural Science Edition), Feb. 1996, 3 pages.
Shutov, A. I. et al., "Prediction of the Character of Tempered Glass Fracture," Glass and Ceramics, vol. 55, Nos. 1-2, 1998, pp. 8-10.
Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.
Southard, J. C., "The Thermal Properties of Crystalline and Glassy Boron Trioxide," Journal of the American Chemical Society, vol. 63, No. 11, Nov. 1941, pp. 3147-3150.
Spaght, Monroe E. et al., "Studies on Glass. VIII. The Coefficient of Thermal Expansion of Boron Trioxide," Journal of Physical Chemistry, vol. 38, No. 1, 1934, pp. 103-110.

Specialty Glass Products, "Soda Lime/AR/Flint Glass"; http://www.sgpinc.com/sodalime.htm accessed Aug. 11, 2016.
Stillinger, Frank H. et al., "Packing Structures and Transitions in Liquids and Solids," Science, New Series, vol. 225, No. 4666, Sep. 7, 1984, pp. 983-989.
Stillinger, Frank H., "A Topographic View of Supercooled Liquids and Glass Formation," Science, New Series, vol. 267, No. 5206, Mar. 31, 1995, pp. 1935-1939.
Tallant, D. R. et al., "The Effects of Tensile Stress on the Raman Spectrum of the Silica Glass," Journal of Non-Crystalline Solids, vol. 106, 1988, pp. 380-383.
Tandon, Rajan et al., "Controlling the Fragmentation Behavior of Stressed Glass," Fracture Mechanics of Ceramics, vol. 14, 2005, pp. 77.
Tomlinson, R., G. Calvert, and A. Conway, "A Photoelastic Investigation Into Spontaneous Glass Fracture", Proceedings of the XIth International Congress and Exposition, (Jun. 2008) 8 pgs.
Varughese, Binoy et al., "Effect of fictive temperature on mechanical strength of soda-lime glasses," Journal of Non-Crystalline Solids, vol. 241, 1998, pp. 134-139.
Walrafen, G. E. et al., "Raman investigation of optical fibers under high tensile stress," Journal of Applied Physics, vol. 52, No. 4, Apr. 1981, pp. 2832-2836.
Wang et al; "Glass and Hot Extrusion by Me Module for 3D Additive Manufacturing"; IEEE, 2016; pp. 1167-1171.
Wang, Fei et al., "Pressure Raman effects and internal stress in network glasses," Physical Review B, vol. 71, 2005, 32 pages.
Weissmann, Rand D. Durkop, "A Novel Method for Measuring Stresses in Flat Glass", XV International Congress on Glass Leningrad 1898, Proceeding 3b, O. V. Mazurin, ed., pp. 217-220.
Yamane, Masayuki, "Chapter 3: Thermal Processing," Glass Engineering Handbook, Asakura Publishing Co. Ltd., Jul. 1999, pp. 410-417.
Yue, Y.Z. et al., "Determination of the fictive temperature for a hyperquenched glass," Chemical Physics Letters, vol. 357, Issues 1-2, May 3, 2002, pp. 20-24.
Zaccaria et al; "Thermal Healing of Realistic Flaws in Glass"; J. Mater. Civ. Eng 2016, 28(2); pp. 04015127-1-04015127-9.
Zaman, F. D. et al., "Cooling of a Plate with General Boundary Conditions," International Journal of Mathematics and Mathematical Sciences, vol. 23, No. 7, 2000, pp. 477-485.
ASTM C1499-09, "Standard Test Method for Monotonic Equibiaxial Flexural Strength of Advanced Ceramics at Ambient Temperature", 2013, 14 pages.
ASTM C158-02, "Standard Test Methods for Strength of Glass by Flexure" (Determination of Modulus of Rupture), 2012, 9 pages.
Guo, Xiaoju et al. "Unified approach for determining the enthalpic fictive temperature of glasses with arbitrary thermal history" Journal of Non-Crystalline Solids, vol. 357, 2011, pp. 3230-3236.
International Search Report and Written Opinion of the International Searching Authority; PCT/US2020/027913; dated Aug. 3, 2021; 11 pages; European Patent Office.
Luo et al., "Competing Indentation Deformation Mechanisms in Glass Using Different Strengthening Methods", Frontiers in Materials, vol. 3, No. 52, 2016, 11 pages.

* cited by examiner

NON-CONTACT COATED GLASS AND RELATED COATING SYSTEM AND METHOD

This application claims the benefit of priority under 35 U.S.C. §119 of U.S. Provisional Application Ser. No. 62/287,186, filed on Jan. 26, 2016, the content of which is relied upon and incorporated herein by reference in its entirety.

BACKGROUND

The disclosure relates generally to a coated glass (including glass-ceramic) material, and specifically to such materials in which a coating material is applied or a coating is formed on the glass in a non-contact environment. Glass materials have many uses including in electronics, displays, in architectural applications such as building windows, in automotive applications such as vehicle windows, etc. In many applications, the glass material may including one or more coating layer on a surface that provides a desired function to the glass, such as low emissivity, reflective properties, anti-static properties, scratch resistance, etc.

SUMMARY

One embodiment of the disclosure relates to a process for applying a coating layer to glass. The process includes providing a glass article having a first surface and a second surface opposing the first surface. The process includes applying a first coating precursor material to the first surface of the glass article. The process includes supporting the glass article via a gas bearing. The process includes heating the glass article and the coating precursor material to above a glass transition temperature of the glass article while the glass article is supported by the gas bearing. During heating, a property of the first coating precursor material changes, such that a first coating layer is formed on the first surface of the glass article from the first precursor material.

An additional embodiment of the disclosure relates to a coated glass article. The coated glass article includes a first major surface, a second major surface opposite the first major surface and glass material of at least 50% silicon dioxide by weight. The coated glass article includes a first coating layer located on the first major surface, and the first coating layer is formed from a material different than the glass material of the glass article. The first coating layer includes a first diffusion zone located within the material of the glass article extending from an interface between the first coating layer and the glass article toward the center of the glass article. Within the first diffusion zone, a concentration of a material of the first coating layer decreases as the depth into the glass article increases, and the diffusion zone has a depth greater than 50 nm.

An additional embodiment of the disclosure relates to an A system for coating a glass sheet. The system includes a heating station including a heating element delivering heat to the glass sheet, and the heating station defines a first channel such that during heating the glass sheet is located within the first channel. The glass sheet includes a first major surface, a second major surface and a thickness between the first and second major surfaces. The system includes a cooling station including opposing first and second heat sink surfaces defining a second channel therebetween such that during cooling the glass sheet is located within the second channel. The system includes a gas bearing delivering pressurized gas to the first and second channels such that the glass sheet is supported by the gas within the first channel without touching a surface of the heating station during heating and such that the glass sheet is supported by the gas within the second channel without touching the first and second heat sink surfaces during cooling. The system includes a supply of glass coating precursor material in communication with the gas bearing such that glass coating precursor material is delivered via the pressurized gas to at least one of the first major surface and the second major surface of the glass sheet while the glass sheet is supported by the gas.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
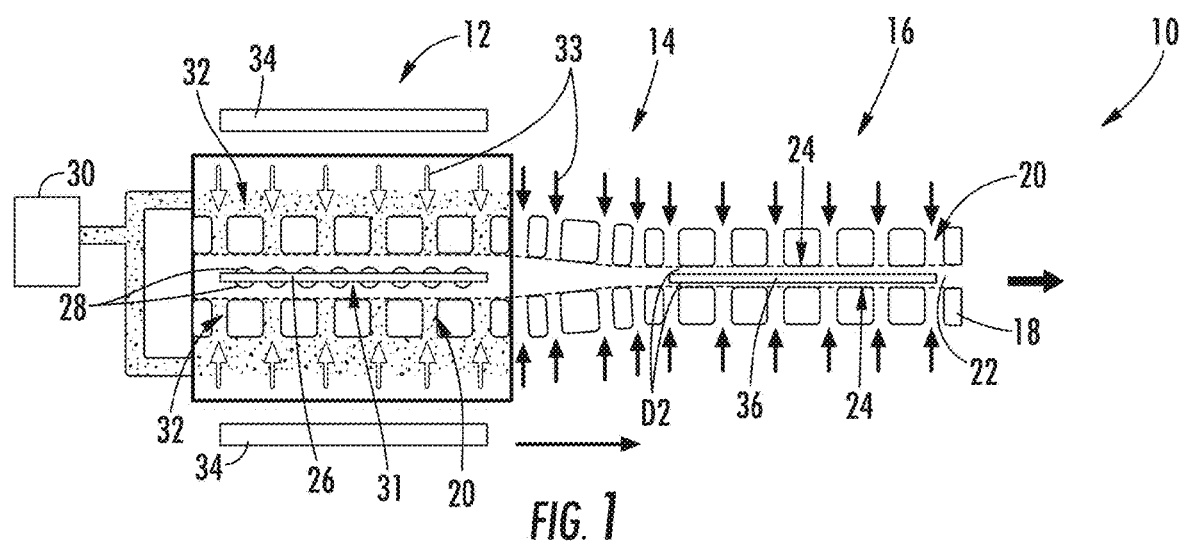
FIG. 1 is a cross-sectional diagram of a coating system according to an exemplary embodiment.

Referring generally to the figures, various embodiments of a coated glass (including glass ceramic) article and of a system and method for forming a coated glass article are shown. In various embodiments discussed herein, the coated glass article is formed, at least in part, in a non-contact coating formation system, and in particular, a coating on the glass article is formed and/or a coating material is applied to the glass article without contacting the major surfaces of the glass article. In various embodiments, this non-contact coating formation is provided by a system that supports the glass article within a double-sided gas bearing while the coating on the glass article is formed and/or the coating material is applied to the glass article.

In various embodiments, it is believed that this non-contact coating formation may provide a glass article with coating layers with a variety of characteristics not believed achievable in solid contact-based or solid support-based coating systems. As explained in more detail below, such properties include low coating defect rate, high glass surface smoothness, low coating thickness variation, etc. In particular embodiments, because the non-contact, gas bearing support system discussed herein enables coating formation on both sides of the glass article, it is believed that highly consistent coatings may be achieved on multiple surfaces of a glass article (e.g., opposing major surfaces of a glass sheet). This is believed to contrast to many types of conventional coating systems that support a glass article during coating via a solid support structure (e.g., rollers, belt, etc.).

In particular embodiments, the supporting gas bearing structure discussed herein is configured as a heating station delivering heat to the glass article to form a coating on the glass article from a coating precursor material. The heated gas bearing arrangement discussed herein is able to deliver a high level of heat to the pre-coated glass article quickly while the glass article is supported by the gas bearings. In particular embodiments, these high heat levels can form a coating layer by altering a property of a coating precursor material to form a coating layer from the precursor material while the article is supported by the gas bearing. In various embodiments, the high heat transfer rates and temperatures achieved with the gas bearing heating system discussed herein are believed to provide benefits over at least some types conventional coating systems. For example, the heated gas bearing arrangements discussed herein do not require vacuum conditions that many thin-film deposition techniques require. Further, the high temperatures achievable in the heated bearing arrangement may allow for use of less volatile coating precursor materials as compared to at least some types conventional coating systems.

In addition, in particular embodiments, the systems and methods described herein are configured to deliver coating precursor materials onto the surfaces of the glass article via the gas streams supplying supporting gas to the gas bearings. In such embodiments, the coating precursor materials may be applied to the glass article prior to heating or at the same time as heating. Further, such embodiments provide a coated glass article in which both the coating precursor material layer and the final coating layer (e.g., following formation via heating) have not been contacted by a solid support structure during formation.

In addition, in particular embodiments, the system and method described herein include a gas bearing-based cooling station that acts to cool the coated glass article following coating material application and/or coating formation while the glass article remains supported by the gas bearing. In such embodiments, the glass article and coating may be cooled to a relatively low temperature (e.g., less than the glass transition temperature of the glass article, to below a melting temperature of a coating material, to room temperature, etc.) prior to the coated glass article coming into contact with a solid support.

Further, in specific embodiments, the system and method described herein include a conductive, gas bearing-based cooling station that acts to cool the coated glass article following coating material application and coating formation primarily via heat conduction from the coated glass to the material of the gas bearings. Such a cooling station supports the heated, coated glass article with an air bearing structure a small gap between opposing gas bearing surfaces such that a small gap distance (e.g., less 200 µm, less than 100 µm, less than 25 µm) is located between each of the glass article surfaces and each of the opposing gas bearing surfaces. By cooling the glass article primarily via conduction, high temperature differentials within the glass article can be generated during cooling which in turn results in high levels of thermal tempering within the glass article. Thus, in such embodiments, the system and method of the present disclosure may form a non-contact coated glass article having high levels of tempering and/or high surface fictive temperatures, not believed to be previously achievable in conventional thermal tempering systems.

Referring to FIG. 1, a system 10 and related method for applying a coating layer to a glass article is shown and described. In general, system 10 includes a heating zone 12, a transition zone 14 and a cooling zone 16. In the embodiment shown, zones 12, 14 and 16 each include opposing gas bearings, shown as air bearings 18. In general, air bearings 18 include a plurality of pores or supply channels 20 that deliver air into a bearing channel 22 defined between opposing air bearing surfaces 24. Air supplied to bearing channel 22 via supply channels 20 is supplied at a large enough rate or pressure such that a glass article 26 is supported within bearing channel 22 such that the glass article does not come into contact with bearing surfaces 24. In various embodiments, the air bearing gap between the glass surfaces and the opposing air bearing surface may be sized to support glass article 26 within system 10, such as less than 1 mm, less than 600 µm, less than 400 µm, less than 300 µm, less than 200 µm, etc. In various embodiments, system 10 may be used to coat discreet glass sheets, and in other embodiments, system 10 may be used to coat long or continuous glass sheets, such as in roll-to-roll coating systems.

Air bearings 18 may be any suitable air support system. In various embodiments, the air bearing bodies may be solid or porous in configuration. Suitable materials for the air bearing bodies include, but are not limited to, aluminum, bronze, carbon or graphite, stainless steel, etc. The air bearing body dimensions may be designed to be sufficient to address the size of the glass sheet and to efficiently and effectively, support the glass article within bearing channel 22 and to efficiently and effectively allow for heat transfer (either heating or cooling) to glass article 26. In the case where the bearing bodies are porous, they may still include additional apertures or holes for flowing gas and/or may use the porous structure to provide flow.

In general, glass article 26 includes one or more layer of coating precursor material 28 applied to one or more surfaces of glass article 26. In the embodiment shown in FIG. 1, glass article 26 includes a coating precursor material layer 28 on both of the opposing first and second major surfaces (e.g., upper and lower surfaces in the orientation of FIG. 1) of glass article 26. In various embodiments, only one surface of article 26 is coated with precursor material layer 28, and in yet other embodiments, the peripheral edge surface (extending between the upper and lower surfaces of glass article 26) is coated with coating precursor material layer 28.

In the embodiment shown in FIG. 1, a supply of coating precursor material 30 is in communication with the air supply delivering the pressurized air to air bearings 18. In such embodiments, coating precursor material 32 travels with the bearing supporting air represented by arrows 33 through supply channels 20 and into bearing channel 22. In such embodiments, coating precursor material 32 is applied to glass article 26 forming precursor coating layer 28 while glass article 26 is supported by air bearing 18 within heating zone 12. In various embodiments, a supply of coating precursor material 30 is in communication with both sides of air bearing 18 such that coating precursor material 30 is delivered to both sides of glass article 26 forming a coating precursor material layer 28 to both major surfaces of article 26. In various embodiments, coating precursor material 32 may be any of the coating precursor materials and/or coating reactants discussed herein and may include various particles, gases, reactive precursors, binders, carriers, etc.

In the embodiment shown, heating zone 12 includes one or more heating elements 34. Heating elements 34 are in communication with the solid portions of the bearing bodies of bearings 18 within heating zone 12 and/or with the air delivered to the heated zone portion of bearing channel 22. In specific embodiments, heating elements 34 may be cartridge heating elements located within or embedded the heated zone portions of bearings 18 that heats the air being delivered to bearing channel 22 within heating zone 12. In general, heating elements 34 generate heat such that glass article 26 is heated while within heating zone 12.

In various embodiments, heating elements 34 generate sufficient heat to change one or more physical property of the coating precursor material of layer 28 to form a coating layer in the final glass article discussed in more detail below. In various embodiments, a physical property of the coating precursor material of layer 28 changed while within heating zone 12 may include a change in bulk material composition (e.g., burn-off of a sacrificial carrier material), change in chemical composition (e.g., oxidation, chemical reaction with additional coating precursor materials, a decomposition, "cracking," etc.), a change in shape of precursor particles, diffusion into the material of glass article 26, a change in a diffusion profile into the material of glass article 26, a change in position relative to a surface of article 26 (e.g., embedding of a particle into the material of article 26), etc. In specific embodiments, coating precursor material of layer 28 includes an organometallic precursor material, and the heat within heating zone 12 is used to "crack" the organometallic precursor to form the coating layer. In yet other embodiments, coating precursor material of layer 28 includes the recombination of precursor materials and generation of by-products.

In various embodiments, heating zone 12 is configured (e.g., through a combination of energy generated by heating elements 34 and dwell time (e.g., 10-15 seconds in some embodiments) of article 26 within heating zone 12) to heat article 26 and coating precursor layer 28 to a temperature greater than 700 degrees C. and below a softening point of the glass material. In other embodiments, heating zone 12 is configured to heat article 26 above the glass softening point. In various embodiments, heating zone 12 is configured to heat article 26 and coating precursor layer 28 to a temperature greater than the glass transition temperature of the material of article 26. In some such embodiments (and explained in more detail below), heated article 26 is then rapidly cooled in cooling zone 16 forming surface compressive stress and central tension (e.g., to thermally temper the glass article) and/or high surface fictive temperatures.

In various embodiments, the process temperatures within heating zone 12 are dependent on a number of factors, including glass composition, glass thickness, glass properties (CTE, etc.), coating reaction kinetics, desired level of strengthening, desired fictive temperature, etc. In some embodiments, system 10 heats the glass article 26 to a temperature between the glass transition temperature and the Littleton softening point, or in some embodiments, even higher. In some embodiments, system 10 heats the glass article 26 to a temperature greater than 620° C., specifically from about (e.g., plus or minus 1%) 620 to about 800° C., about 640 to about 770° C., about 660 to about 750° C., about 680 to about 750° C., about 690 to about 740° C., or about 690 to about 730° C. For SLG, for example, system 10 heats the glass article 26 to a temperature greater than 640° C., specifically about (e.g., plus or minus 1%) 640 to about 730° C. or between about 690 to about 730° C. In some embodiments, article 26 entering heating zone 12 may be preheated such that heating zone 12 raises the temperature of article 26 from the preheat temperature to the final temperature (e.g., rather than from room temperature to the final temperature).

In some embodiments, gaps 31, between the hot zone portion of air bearing 18 and the upper and lower surfaces of glass article 26 may be relatively large, on the order of 0.05" (1.27 mm) to 0.125" (3.175 mm) or greater, and in such embodiments, glass article 26 is heated up via thermal radiation from the hot zone air bearings 18 into the glass article 26. In other embodiments, hot zone gap 31 may be as small as between 150 microns and 500 microns on each side of the glass article 26. In such small gap heating zones, heating of article 26 may be significantly or primarily though conduction of hear from the bodies of air bearing 18 to article 26. In addition, in some embodiments, these small gaps are believed to be advantageous, because they enable the bearings to have better "stiffness"—i.e., ability to centralize the glass and therefore flatten it while it is in its softened state. In some embodiments, the process may re-form the glass sheets—flattening them—in the initial heating step, for example via the pressure supplied by the air bearings 18.

Following heating and/or coating within heating zone 12, heated glass article 26 is moved through transition zone 14 and into cooling zone 16. As shown in the embodiment of FIG. 1, the distance between opposing bearing surfaces 24 is greater in heating zone 12 than in cooling zone 16, and the opposing bearing surfaces 24 within transition zone 14 have a tapered shape providing the transition from larger distance within heating zone 12 and the smaller distance, shown as D1, in cooling zone 16. In some embodiments, additional low temperature coatings application zones follow cooling zone 16 such that low temperature coatings are applied after coated glass article 36 exits cooling zone 16, such as to form a superhydrophobic coating.

In various embodiments, while within cooling zone 16, glass article 26 is cooled as desired to form the appropriate glass article or coating composition, shown as coated glass article 36. In particular embodiments, while within cooling zone 16, glass article 26 is cooled to below a glass transition temperature of the material of glass article 26, while glass article 26 is supported by air bearings 18. In another embodiment, while within cooling zone 16, glass article 26 is cooled to room temperature, while glass article 26 is supported by air bearings 18. This cooling forms a cooled, coated glass article 36 from the precursor coated article 26.

In the particular embodiment shown, cooling zone 16 is structured such that heated glass article 26 and coating precursor layer 28 is cooled substantially by conductive transfer of heat from article 26 to bearings 18 forming coated glass article 36. In various embodiments, substantial conductive cooling is achieved by sizing bearing channel 22 relative to the thickness of glass article such that the distance, D2, between the outer surfaces of glass article 26 and bearing surfaces 24 is relatively small. In various embodiments, channel 22 is sized such that at least 20% of the thermal energy leaving heated article 26 during cooling crosses the gap, D2, and is received by the bodies of air bearings 18, and specifically such that at least 50% of the thermal energy leaving heated article 26 during cooling crosses the gap, D2, and is received by the bodies of air bearings 18.

In specific embodiments, D2 is less than 200 μm, and specifically is greater than 10 μm and less than 200 μm, and Applicant has identified that these small air bearing gaps when combined with relatively low air flow rates (e.g., flow rates selected to support glass article 26 rather than to cool convectively) results in the high levels of conductive heat transfer set forth above. In various embodiments, cooling zone 16 has a heat transfer rate to air bearings 18 greater than 450 kW/m$^2$ per unit area of the major surfaces of article 26. As will be described in more detail below, in some such embodiments, the rapid, conductive cooling provided by cooling zone 16 thermally tempers glass article 26 by forming surface compressive stress and central tension within the final, coated glass article 36. In some embodiments, cooling zone 16 portion of air bearings 18 are actively cooled (e.g., through flow of cooling fluid through the bearing bodies) to further facilitate high cooling rates, particularly in a continuous system.

In various embodiments, system 10 and the related process may be any of the systems or processes or may incorporate any of the system components, elements, features or process steps, in any combination, described in the following US patent applications: U.S. Ser. No. 14/814,232, filed Jul. 30, 2015; U.S. Ser. No. 14/814,181, filed Jul. 30, 2015; and U.S. 62/236,296, filed Oct. 2, 2015. All three of which are incorporated herein by reference in their entireties. In various embodiments, glass article 26 and/or glass article 36 may be any of the glass articles or materials or may incorporate any of the glass article features, characteristics, etc., in any combination, described in the following US patent applications: U.S. Ser. No. 14/814,232, filed Jul. 30, 2015; U.S. Ser. No. 14/814,181, filed Jul. 30, 2015; and U.S. 62/236,296, filed Oct. 2, 2015. All three of which are incorporated herein by reference in their entireties In various embodiments, Applicant believes that utilizing a non-contact, air bearing based heating zone, such as heating zone 12, provides a number of advantageous and/or unique glass coating characteristics and features compared to various conventional coating systems, for a wide range of coating materials. For example, as compared to various vacuum-based coating techniques, such as vacuum chemical vapor deposition (CVD) and sputtering, heating zone 12 does not necessarily need vacuum conditions for coating formation, and the coating processes discussed herein are believed to provide a more efficient, robust and economical approach to coating certain glass articles, such as large glass articles used for building windows, vehicle windows and large displays. In addition, as compared to some coating techniques that utilize highly reactive and volatile coating precursor materials (e.g., atmospheric CVD coating processes), the high temperatures delivered by heating zone 12 allows for coating formation utilizing less reactive or volatile coating precursor material by relying on high heat kinetics to cause the reactions needed for certain coating formation.

Further, utilizing high temperatures during glass coating application and/or coating layer formation typically cause a decrease in glass article quality (e.g., such as high levels of warp, increased surface roughness, etc.) that results from contact with a solid support, while the glass article is softened due to the increased temperature. The non-contact coating process discussed herein is believed to allow for utilizing high temperatures during coating without the same decreases in glass article quality. In at least some embodiments, the non-contact coating process discussed herein also is believed to result in superior coating quality by reducing coating defects and reducing the chance of pinhole formation. The present system and method addresses such problems by utilizing air bearings to support the heated glass article during coating application and/or formation and during cooling of the glass article. In addition, utilization of the air-bearing based heating and cooling process for coating or forming a coating layer on a glass article enables a continuous manufacturing process in contrast to batch processes typical with CVD techniques.

Further, the high temperature coating application or formation may allow for coating layers to be formed with high levels of diffusion into the glass article provided by the high temperature within heating zone 12. Such high diffusion rates may provide for high levels of bonding between the coating material and the glass article. For some applications, such as abrasion resistant coatings, it is believed that the diffusion profile created by the high temperatures within heating zone 12 provides a gradual transition from the physical properties of a coating layer to the physical properties of the glass article, and it is believed that this gradual transition will distribute contact stresses more evenly than coating applications with little or no coating diffusion adjacent the glass surfaces.

In addition, the double-sided air bearing support allows coating to be applied and/or formed to both sides of the glass article at the same time under the same conditions in one heating/coating step. This system and process allows for coating layers to be formed on both surfaces of the glass article having highly consistent or identical physical and/or chemical properties as each other.

Figure 2:
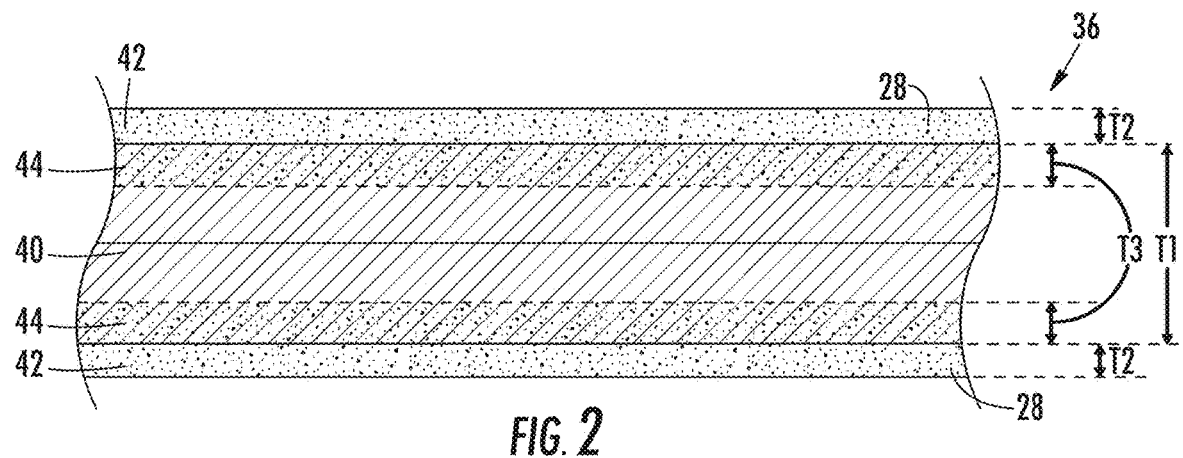
FIG. 2 is a partial cross-sectional view of a coated glass sheet according an exemplary embodiment.

Referring to FIG. 2, a detailed cross-sectional view of final coated, glass article 36 following coating layer formation and cooling, is shown. In the embodiment shown, glass article 36 includes glass material 40, and coating layers 42 are located on the opposing major surfaces of glass material 40. Coating layers 42 are the layers formed from coating precursor material 28 following processing through system 10, and in some embodiments, coating precursor material 28 or a portion thereof remains within coating layers 42 following formation.

In various embodiments, coating layers 42 are contiguous, continuous coating layers covering all or substantially all of the major surfaces of glass material 40. It should be understood that while coating layers 42 are each generally shown as a single layered, conformal coating, each coating layer 42 may include multiple layers of different materials providing different functionality at each layer, may include discreet particles, may include altered surface structures, may include altered surface chemistry and/or may include patterned zones or regions of any of these layer types. In some embodiments, a patterned coating layer 42 may be one or more coating layer including one or more coating zones interrupted by uncoated sections of glass surface or by differently coated sections of glass. In such embodiments, a patterned coating layer 42 covers a portion (e.g., less than all) of the major surfaces of the glass. In such embodiments, the patterned coating layer 42 does not completely coat the entire surface of the glass article. In some such embodiments, a patterned coating layer 42 may be a coating layer for various applications where the coating functionality is only provided at certain sections of the surfaces of the glass. In specific embodiments, a patterned coating layer 42 may provide zones of different refractive index along a glass article and/or zones of increased surface roughness for enhanced gripping at particular portions of the glass article.

Glass material 40 of glass article 36 has a thickness, T1, and each coating layer 42 has a thickness, T2. In various embodiments, T1 is between 10 µm and 15 mm, and specifically between 10 µm and 7 mm, as may be needed for a particular application. In a particular embodiment, glass article 36 is a soda-lime architectural glass having a thickness of 6 mm. In specific embodiments, T1 is a very low thickness, and in such embodiments, the air bearing supports and/or conductive tempering provided by system 10 allows T1 to be particularly low compared to solid contact based support systems and/or conventional thermal tempering systems. In such embodiments, T1 is between 10 µm and 2 mm, and more specifically is between 100 µm and 2 mm. In various embodiments, T2, may also be selected based on a particular coating application or coating material. In general, T2 is less than T1, such as less than 50% of T1, less than 10% of T1, less than 1% of T1, between 0.001% and 10%. In various embodiments, In various embodiments, T2 is between 1 nm and 1000 nm.

Glass article 36 includes diffusion zones 44 adjacent the major surfaces of glass material 40. As will be understood, diffusion zones 44 are zones in which one or more component of coating layers 42 have migrated into glass material 40, particularly during heating within heating zone 12. In various embodiments, Applicant believes diffusion zones 44 may be particularly deep due to the high temperature within heating zone 12 and/or due to the amount of time that glass article 26 spends within heating zone 12, as compared to coating systems in which the glass is at relatively low temperature during coating. Further, Applicant believes that the diffusion zones 44 provide a zone of gradual transition from the coating material to the glass material, as compared to coating systems in which the glass is at relatively low temperature during coating. In at least some embodiments, Applicant believes that the depth and/or transition provided by diffusion zones 44 provide improved coating functionality. For example, Applicant believes that the diffusion zones 44 discussed herein may result in a improved coating-to-glass interface than coatings with little or no diffusion into the glass, and this improved coating-to-glass interface is believed to decrease/eliminate the risk of coating spalling and/or delamination.

As shown in FIG. 2, diffusion zones 44 have a depth, shown as T3. In various embodiments, T3 is greater than 50 nm, specifically is greater than 50 nm and less than 2 µm, and more specifically greater than 50 nm and less than 1.5 µm. In various embodiments, diffusion depth T3 is the depth within the glass at which the concentration of a coating material is between 10% and 20% of the concentration of the coating material at the surface of the glass, and more specifically 15% of the concentration of the coating material at the surface of the glass. As will be understood the depth of diffusion zone 44 will depend on various factors including the temperature of heating zone 12, the time glass article 26 spends in heating zone 12, the charge of the diffusing coating component, the size of the diffusing coating component, etc. In various embodiments, diffusion zones 44 may be characterized using methods such as X-ray Photoelectron Spectroscopy (XPS) or Dynamic Secondary Ion Mass Spectrometry (DSIMS) or any other suitable technique that allows for depth profiling of a chemical composition into a glass material.

In various embodiments, the thickness of the coating layer, T2, and the depth of the diffusion zone T3, may vary along the length or width of article 36. In such embodiments, T2 and T3 may be controlled by controlling the speed at which article 26 traverses heating zone 12. Further, the depth and/or composition profile of diffusion zone 44 may further be controlled by varying the temperature at different times as article 26 traverses heating zone 12. Gradients or variations in the coating along the upper or lower surfaces of article 26 may be formed by varying the gas or precursor delivery composition spatially across the length or width of air bearing 18 and/or by varying gas or precursor delivery composition with time, while glass article 26 traverses heating zone 12. In a particular embodiment, a coating layer 42 and/or diffusion layer 44 is formed that varies in all three dimensions by combining these techniques.

In general, diffusion zones 44 generally define a diffusion profile between the surfaces of glass material 40 and the interior-most or deepest portion of diffusion zone 44. In various embodiments, within diffusion zones 44 the concentration of one or more coating component decreases as the distance into glass material 40 increases. In some embodiments, the concentration of the coating component decreases linearly as the as the distance into glass material 40 increases, and in another embodiment, the concentration of the coating component decreases nonlinearly as the as the distance into glass material 40 increases.

In particular embodiments, the non-contact, air bearing support provided within system 10 ensures that various properties of both upper and lower coating layers 42 are highly consistent to each other. In particular embodiments, this high level of consistency results at least in part from the fact that precursors for both upper and lower coating layers 42 were applied at and/or formed at the same time, under the same conditions within heating zone 12 (e.g., in contrast to glass coating processes that coat each glass surface in separate, sequential steps). In particular embodiments, the thicknesses, T2, of both upper and lower coating layers 42 are within 10% of each other, specifically within 1% of each other, and more specifically within 0.1% of each other. In particular embodiments, the thicknesses, T3, of both upper and lower diffusion zones 44 are within 10% of each other, specifically within 1% of each other, and more specifically within 0.1% of each other.

In some embodiments, other properties such as coating strength, coating integrity, coating robustness, refractive index, electrical sheet resistance, optical transmission, reflection, hardness, modulus of elasticity, etc. may be the same or similar between the upper and lower coating layers 42 (e.g., within 10%, 5%, 1% or 0.1% as each other). In various embodiments, the difference between the electrical resistance of upper and lower coating layers 42 is low, such as less than 5% and more specifically less than 3%. In various embodiments, the difference between the optical transmission of upper and lower coating layers 42 is low, such as less than 5% and more specifically less than 3%. In various embodiments, the difference between the reflectance of upper and lower coating layers 42 is low, such as less than 5% and more specifically less than 3%. In various embodiments, the difference between the hardness and/or Young's modulus of elasticity of upper and lower coating layers 42 is low, such as less than 5% and more specifically less than 3%.

In various embodiments, a wide range of different coatings can be applied and/or formed using system 10. In various embodiments, the material of precursor coating layer 28 may be selected to form a coating providing a wide range of properties. In various embodiments, the material of precursor coating layer 28 may be selected to form one or more of a low emissivity coating (e.g., for heat management), an anti-static coating, an anti-glare coating, anti-glare (e.g., fluoride coating), an anti-reflective coating, a low friction coating, an anti-microbial coating, a glass tint, an abrasion or scratch resistant coating, a water resistant coating, a water soluble coating, a coating to increase surface compressive stresses/strength/temper of the associated glass article, etc. In some embodiments, coatings may be applied that increase adhesion for lamination purposes to organic or inorganic substrates. In addition as discussed herein, the material of precursor coating layer 28 may be selected to form a coating that changes an optical property of the article, which changes a physical surface property, such as surface texture, roughness, etc. of the article and/or which changes a chemical surface property of the article.

In some embodiments, the coating layer formed from precursor coating layer 28 may be formed from a material that has a coefficient of thermal expansion (CTE) different than that of the glass. In at least some embodiments where the CTE of the coating is greater than the CTE of glass material 40, the coating layer is in compression and glass material 40 is in tension. In at least some embodiments where the CTE of the coating is less than the CTE of glass material 40, the coating layer is in tension and glass material 40 is in compression. In some such embodiments, imparting compressive stress with an increased CTE coating layer provides a stronger damage resistant glass article similar to thermal or chemical tempering. In other embodiments, imparting tensile surface stress with a decreased CTE coating layer provides a weakened glass article which may find use in certain applications such as in emergency release/access panels, fire alarms, emergency exits, and other "break here" articles. In some embodiments, a coating with a diffusion zone, as discussed above, may be used to alter the surface of the glass to have a lower CTE such that compression is formed in the coating layer to prevent initial crack nucleation.

In various embodiments, precursor coating layer 28 may be one or more layer of an inorganic coating material. In various embodiments, precursor coating layer 28 may include a metal precursor to form a metal oxides (in presence of oxygen), nitrides (in presence of nitrogen), carbides (in presence of acetylene), sulfides, selenides, organometallic materials etc. In various embodiments, precursor coating layer 28 may include one or more of $SiO_2$, Ag salts (e.g., AgCl), Cu salts (e.g., CuCl), Na salts (e.g., NaCl), $BN$, $TiO_2$, $ZnO$, $MgF_2$, aluminum-doped ZnO, lithium salt, Cu, Au, Ag, Al, Sn, C, an oxide, a nitride, a carbide, a sulfide, a selenide, fluoride, aluminum oxynitride, TiN, $TiSi_2$, an organometallic material, amorphous silicon, polycrystalline silicon and fluorine doped $SnO_2$. In various embodiments, precursor coating layer 28 may be a solid material (e.g., a particulate material) or coating material in a solution. In particular embodiments, precursor coating layer 28 may be a solid salt or solid organometallic material (e.g., a particulate material) or may be a salt or organometallic solution. In various embodiments, precursor coating layer 28 may include one or more precursor material supported by a carrier or binder. In various embodiments, precursor coating layer 28 may include one or more coating precursor material in an aqueous solution. In some embodiments, precursor coating layer 28 may include one or more reactive component that react under the heated conditions within heating zone 12 to form a coating layer. In such embodiments, multiple reactive components within precursor coating layer 28 may react to form the coating layer and/or the reactive component of precursor coating layer 28 may react with a gas (e.g., oxygen, nitrogen, etc.) delivered to bearing channel 22 within heating zone 12. In some embodiments, precursor coating layer 28 may be formed from a gaseous precursor material that is cracked utilizing the high temperature within heating zone 12. In some embodiments, precursor coating layer 28 may be formed from an organometallic material, which is applied in as a solution and/or as a gas. In some embodiments, precursor coating layer 28 may be a carbon material forming a hermetic carbon layer around a glass article.

In various embodiments, glass material 40 of coated glass article 36 may be any suitable glass or glass-ceramic material as needed for different applications. In various embodiments, glass material 40 may be any glass including at least 50%, and more specifically, at least 70%, silicon dioxide ($SiO_2$) by weight. In some contemplated embodiments, glasses coated and/or strengthened via the processes and systems discussed herein (such as glass article 36) may include an amorphous material, a crystalline material or a combination thereof, such as a glass-ceramic material. Glasses coated and/or strengthened via the processes and systems discussed herein (such as glass article 36) may include a soda-lime glass (SLG), an alkali aluminosilicate glass, alkali containing borosilicate glass, alkali aluminophosphosilicate glass, alkali boron-aluminum-phosphosilicate glasses or alkali aluminoborosilicate glass. In various embodiments, coated glass article 36 is suitable for a wide variety of uses including double pane windows, monolithic architectural glass, architectural window glass, cover glass, glass for architectural surfaces such as counter tops, structural glass, automotive glass, display glass, deposition substrates, electronic substrates, etc. In contemplated embodiments, the glass articles discussed herein may be formed from monolithic glass or laminated glass. In contemplated embodiments, coated articles, as disclosed herein, may be glass sheets, such as windows, and/or may not be flat sheets, such as glass articles having one or more curvatures, bumps, indentations, rolling waves, etc.

Figure 3:
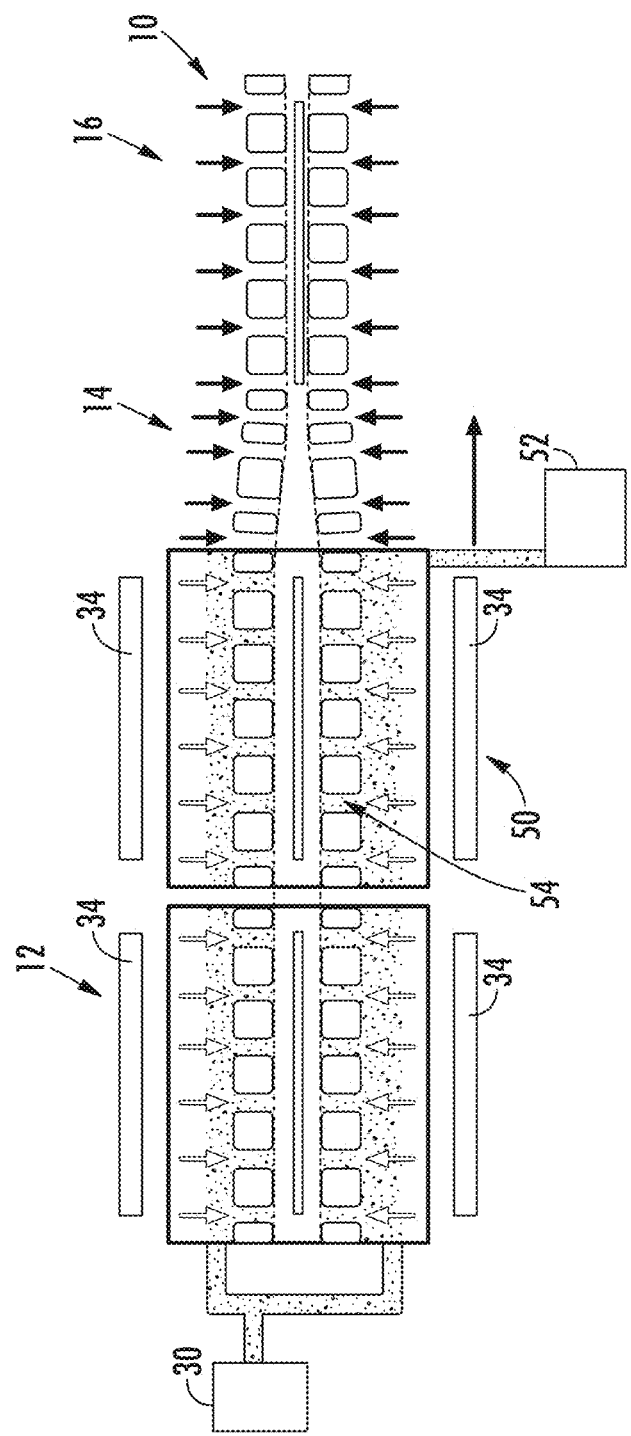
FIG. 3 is a cross-sectional diagram of a coating system according to another exemplary embodiment.

Referring to FIG. 3, system 10 is shown according to another exemplary embodiment in which system 10 is configured to apply multiple layers of precursor coating materials onto glass article 26 in order to form a multi-component coating layer or a multi-layer coating layer following cooling. In this embodiment, system 10 includes one or more additional heated zones, shown as additional heating zone 50. In this embodiment, a second supply of coating precursor material 52 is in communication with the air supply delivering the pressurized air to air bearings 18. In such embodiments, second coating precursor material 54 travels with the bearing air into bearing channel 22 within additional heating zone 50.

In one such embodiment, second coating precursor material 54 forms an outer layer on top of first coating precursor material 32. In some such embodiments, during heating, a multi-layer coating layer 42 is formed having an inner portion formed from first precursor material 32 and an outer portion formed from second coating precursor material 54. In other embodiments, first precursor material 32 is a first reactant, and second precursor material 54 is a second reactant, that react with each other while heated within additional heating zone 50 forming a coating layer 42 formed from the reaction product of first precursor material 32 and second precursor material 54. In other embodiments, a multi-component coating layers or multi-layer coatings may be formed by timing the flow of different coating materials while glass article 26 is within a single heating zone.

Figure 4:
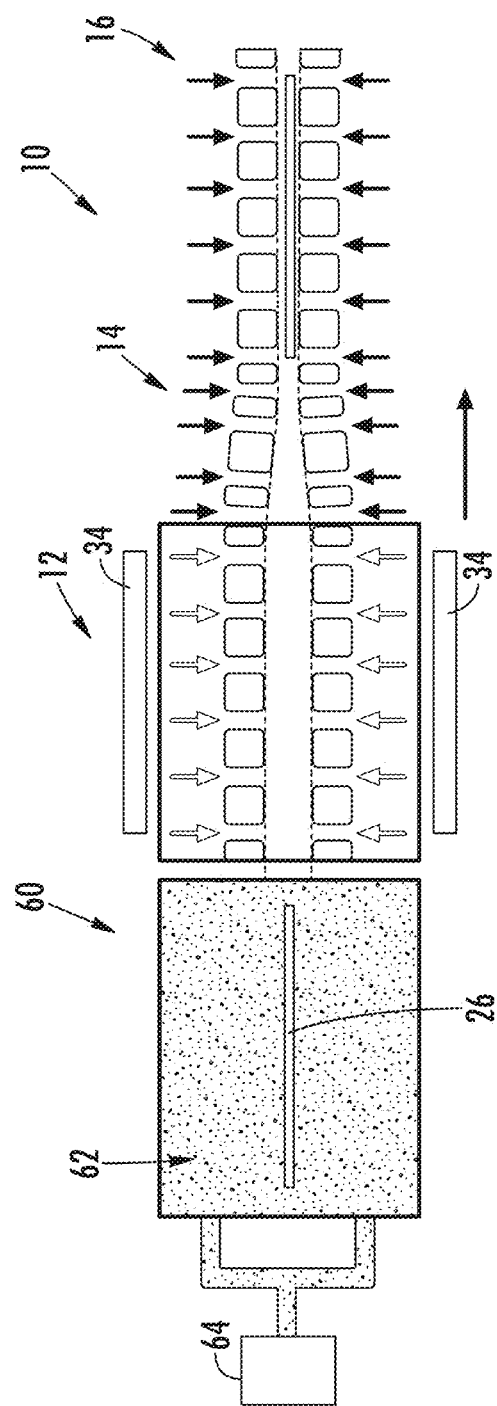
FIG. 4 is a cross-sectional diagram of a coating system according to another exemplary embodiment.

Referring to FIG. 4, system 10 is shown according to another exemplary embodiment in which system 10 includes a preliminary coating zone 60 that is configured to apply coating precursor material 62 prior to the entry of glass article 26 into heating zone 12. In such embodiments, coating zone 60 is a non-air bearing based coating system in which coating precursor material 62 is applied to glass article 26 from supply 64 prior to entering heating zone 12. Coating zone 60 may include any suitable coating process, including spin-coating, spray coating, mist coating, dip coating, aerosol-type coating, electrostatic-based coating, etc. In such embodiments, heating zone 12 may apply heat to article 26 coated with precursor material 62 changing a physical property of the material to form a coating layer, such as layer 42. In some embodiments, heating zone 12 may deliver coating precursor material 32, as discussed above. In one such embodiment, precursor material 32 forms an outer layer on the layer of precursor material 62 applied by coating zone 60 such that a multi-layer coating 42 is formed following cooling. In another such embodiment, first precursor material 32 is a first reactant, and precursor material 62 is a second reactant, that react with each other while heated within additional heating zone 50 forming a coating layer 42 formed from the reaction product of first precursor material 32 and second precursor material 62.

Figure 5:
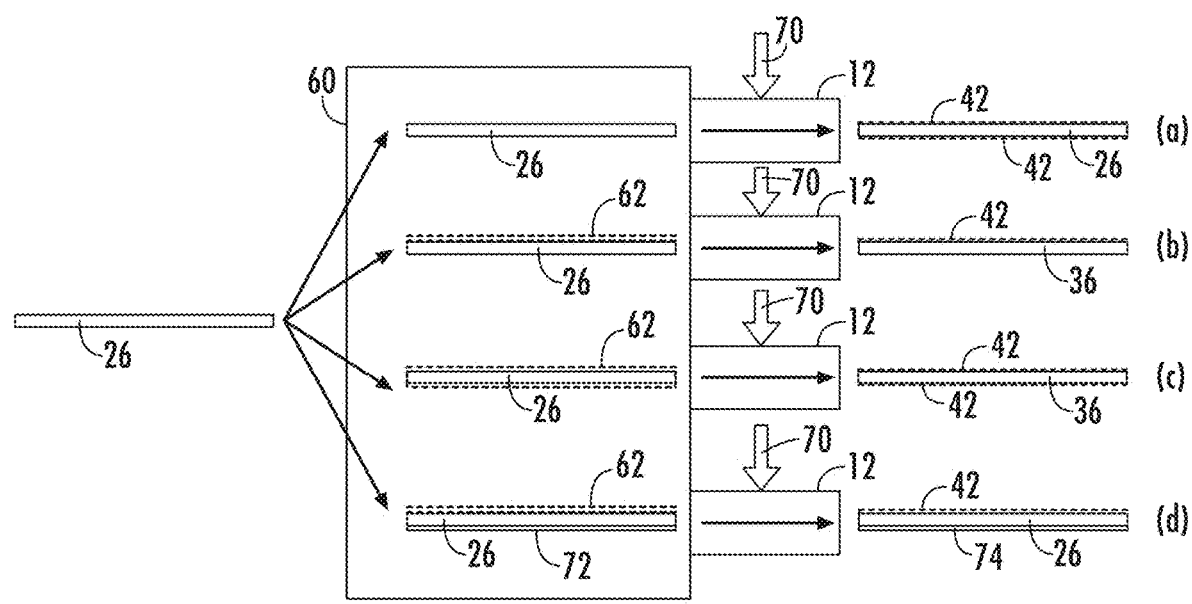
FIG. 5 is a diagram of a coating system according to another exemplary embodiment.

Referring to FIG. 5, various embodiments of a process of forming a coated glass article utilizing system 10 is shown. In FIG. 5(a), a glass article 26 prior to coating is delivered to heating zone 12, and gas phase reactants 70 and heat are delivered to heating zone 12 such that coating layers 42 are formed on glass article 26 following cooling.

In FIG. 5(b), coating precursor materials, such as coating precursor materials 62, are applied to one surface of glass article 26 and the other surface is left uncoated. Article 26 is then delivered to heating zone 12, and gas phase reactants 70 and heat are delivered by heating zone 12 such that a single coating layer 42 is formed on coated glass article 36 following cooling while the lower surface remains uncoated. In various embodiments, gas phase reactants 70 may be delivered in gas mixtures including, atmospheric, oxygen containing, nitrogen containing or other carrier or reactive gases containing mixtures or combinations thereof In FIG. 5(c), coating precursor materials, such as coating precursor materials 62, are applied to both upper surface and lower surfaces of glass article 26. Article 26 is then delivered to heating zone 12, and gas phase reactants 70 and heat are delivered by heating zone 12 such that coating layers 42 are formed on both the upper and lower surfaces of coated glass article 36 following cooling.

In FIG. 5(d), a first coating precursor material, such as coating precursor material 62, is applied to the one surface of glass article 26, and a different coating precursor material, shown as precursor material 72, is applied to another surface of glass article 26. Article 26 is then delivered to heating zone 12, and gas phase reactants 70 and heat are delivered by heating zone 12 such that a coating layer 42 is formed on the upper surface of coated glass article 36 from precursor material 62 following cooling and such that a coating layer 74 is formed on the lower surface of coated glass article 36 from precursor material 72 following cooling. In this embodiment, coated glass article 36 includes different coating layers on the upper and lower surfaces of the coated glass article 36.

Figure 6:
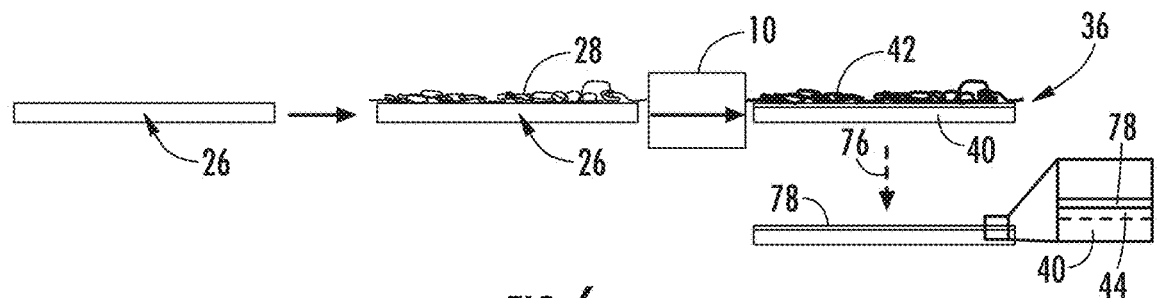
FIG. 6 is a diagram of a coating system according to another exemplary embodiment.

Referring to FIG. 6, a process for forming a coated glass article is shown according to an exemplary embodiment. In this embodiment, coating precursor layer 28 is applied to one or more surface of a glass article 26. Coating precursor layer 28 may be applied either through air delivered by the air bearing within heating zone 12 and/or by a preliminary coating process, such as by coating station 60. In this specific embodiment, coating precursor layer 28 includes a reactant and a sacrificial binder material. Next, glass article 26 is processed through system 10 forming a coated article 36. In this embodiment, coating layer 42 is formed by changing at least the composition of coating precursor layer 28 through the burn-off of the sacrificial binder component of layer 28, leaving primarily the reactant component forming coating layer 42. In the particular embodiment of FIG. 6, a washing or etching step 76 is preformed to remove any remaining binder and/or reactant forming a final coating layer 78. As shown in the magnified insert, similar to coating layer 42, layer 78 includes a diffusion zone 44 within the glass material 40 of coated article 36.

Figure 7:
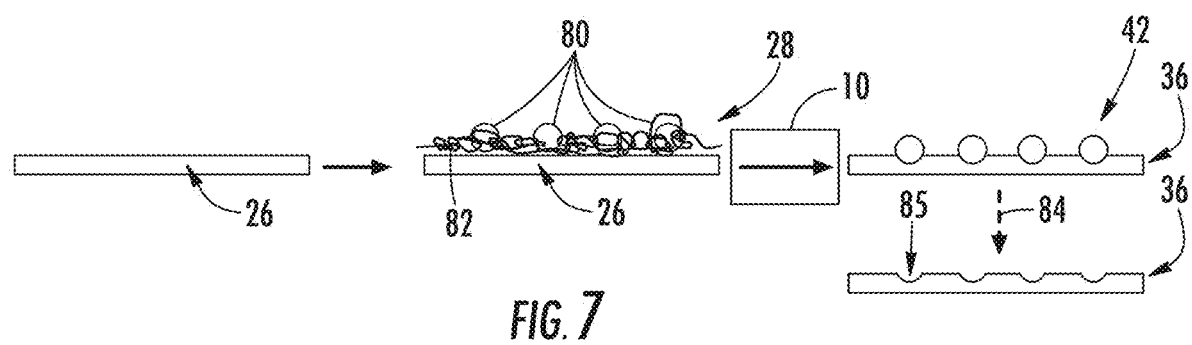
FIG. 7 is a diagram of a coating system according to another exemplary embodiment.

Referring to FIG. 7, a process for forming a coated glass article is shown according to an exemplary embodiment. In this embodiment, coating precursor layer 28 is applied to one or more surface of a glass article 26. Coating precursor layer 28 may be applied either through air delivered by the air bearing within heating zone 12 and/or by a preliminary coating process, such as by coating station 60. In this specific embodiment, coating precursor layer 28 includes a plurality of coating particles 80 and supported by a sacrificial binder material 82. In various embodiments, particles 80 are $SiO_2$ particles and/or $TiO_2$ particles. Next, glass article 26 is processed through system 10 forming a coated article 36. In this embodiment, coating layer 42 is formed by changing at least the composition of coating precursor layer 28 through the burn-off of the sacrificial binder 82 of layer 28 caused by the heat within heating zone 12. In addition in this embodiment, the heat within heating zone 12 also causes an embedding or fusing of particles 80 to glass material 40. In some embodiments, the embedded particles 80 are formed from a material providing the desired coating function to coated glass article 36.

In other embodiments, particles 80 may be used to form or imprint a surface structure or desired surface roughness to the outer surface of the glass portion 40 of article 36. In such embodiments, at step 84, article 36 is washed or etched removing particles 80 from glass portion 40. This leaves a glass article 36 having a textured outer surface 85 that has surface features sized and shaped based on the size of particles 80. In various embodiments, textured outer surface 85 may provide desired optical properties, chemical functionally, increased area for binding to downstream deposited layers, etc.

Figure 8:
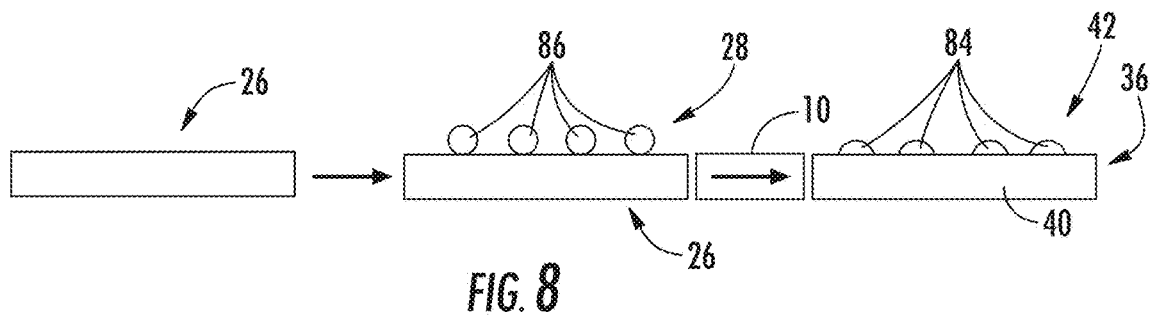
FIG. 8 is a diagram of a coating system according to another exemplary embodiment.

Referring to FIG. 8, a process for forming a coated glass article is shown according to an exemplary embodiment. In this embodiment, coating precursor layer 28 is applied to one or more surface of a glass article 26. Coating precursor layer 28 may be applied through air delivered by the air bearing within heating zone 12 and/or by a preliminary coating process, such as by coating station 60. In this specific embodiment, coating precursor layer 28 includes a plurality of coating particles 86. In some embodiments, coating particles 86 are applied without a binder material. Next, glass article 26 is processed through system 10 forming a coated article 36. In this embodiment, coating layer 42 is formed by changing at least the shape of particles 86 of coating precursor layer 28, for example through melting caused by the heat within heating zone 12. As shown in FIG. 8, this melting causes particles 86 to deform, embed, spread out, etc. forming shaped particles 88. In one embodiment, shaped particles 88 provide a textured surface to article 36. In one embodiment, particles 88 may be $SiO_2$ particles providing an anti-glare property to article 36.

In one embodiment, particles 86 are formed from a glass material that has a lower melting temperature than that of glass material 40. In one such embodiment, particles 86 melt forming a shape such that shaped particles 88 act as lenses. In various embodiments, particles 86 may be nano-sized particles and/or micro-sized particles. In such embodiments, the shape of melted, shaped particles 88 can be controlled by selecting material for particles 86 having a desired viscosity, surface energy and/or surface tension.

Figure 9:
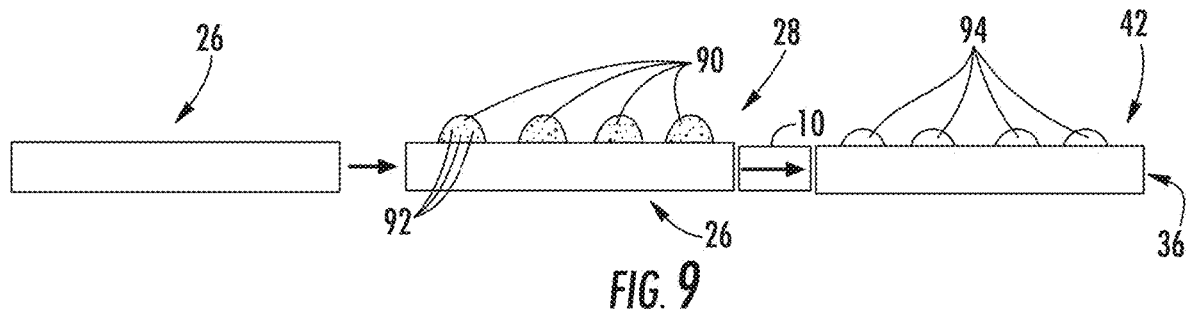
FIG. 9 is a diagram of a coating system according to another exemplary embodiment.

Referring to FIG. 9, a process for forming a coated glass article is shown according to an exemplary embodiment. In this embodiment, coating precursor layer 28 is applied to one or more surface of a glass article 26. Coating precursor layer 28 may be applied through air delivered by the air bearing within heating zone 12 and/or by a preliminary coating process, such as by coating station 60. In this specific embodiment, coating precursor layer 28 includes a plurality of discreet drops 90 of coating material precursor. In the embodiment shown, coating precursor drops 90 include a plurality of coating particles 92 supported by a sacrificial binder/ink material. Following coating with drops 90, glass article 26 is processed through system 10 forming a coated article 36. In this embodiment, coating layer 42 is formed by changing at least the composition of coating precursor layer 28 through the burn-off of the sacrificial binder/ink material of each of the precursor drops 90 caused by the heat within heating zone 12. In addition, in some embodiments, the heat within heating zone 12 also causes particles 92 to melt or fuse together forming coating structures 94 which are bound or embedded in glass material 40 of coated glass article 36. Similar to shaped particles 88, structures 94 may be shaped to act as lenses.

Figure 10:
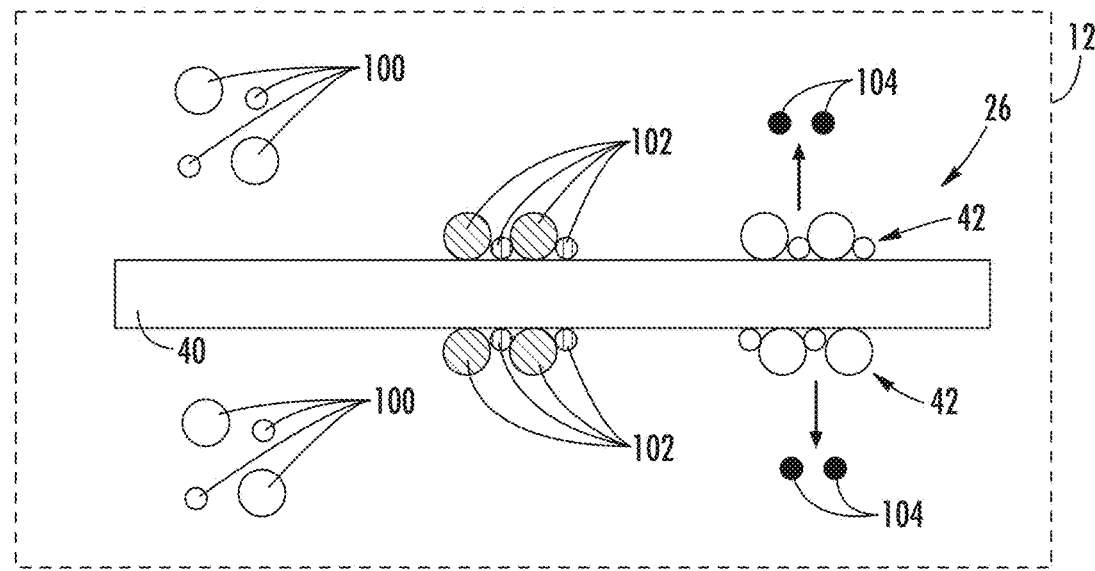
FIG. 10 is a diagram of a coating system according to another exemplary embodiment.

Referring to FIG. 10, a process for forming a coated glass article is shown according to an exemplary embodiment. FIG. 10 schematically shows the steps of forming a CVD-type coating on a glass article via heating zone 12. As shown in FIG. 10, within heating zone 12, reactive coating precursors 100 are directed onto the glass material 40 of article 26. In such embodiments the reactive coating precursors may be delivered via the air bearing air flow, as discussed above regarding coating precursor 32 in FIG. 1. Driven by the heat within heating zone 12, reactive coating precursors 100 undergo adsorption and/or surface reactions forming surface attached coating precursors 102. As the process continues, driven by the heat within heating zone 12, film growth continues forming coating layer 42 from reactive precursors 100. In some such embodiments, volatile by-products 104 are released during the process. However, Applicant believes that, at least in comparison to some CVD-type process, the high heat of zone 12 allows for coating formation from reactive precursors that release fewer or less volatile by-products 104. The reactive precursors 100 can be added using different carrier gases which can be inert (Ar) or also serve as reactive components, such as formation of metal oxides (e.g., with oxygen containing gas) or metal nitrides (e.g., with nitrogen) or metal carbides (e.g. with acetylene) or others and combinations thereof (oxycarbide, oxynitride, etc.). In yet other embodiments, various dopants are delivered via the air bearing air flow along with reactive coating precursors 100 to form dopant levels of the desired amount, for example to impart additional properties or for property enhancement (i.e., conductivity).

Figure 11:
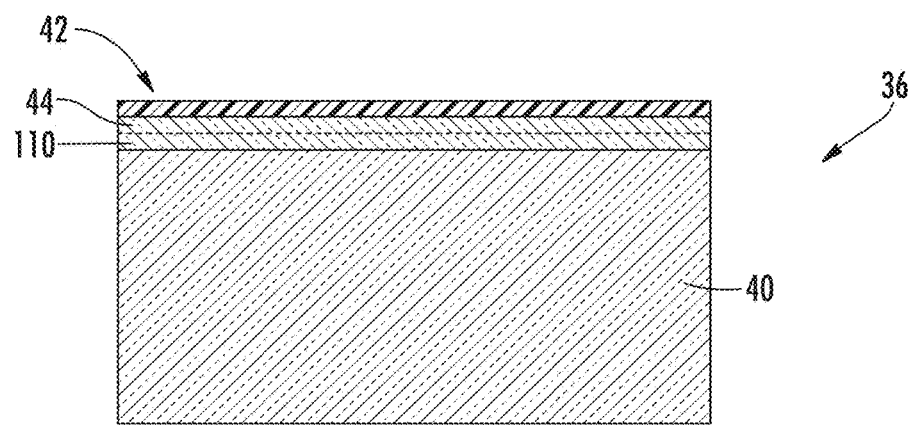
FIG. 11 is a partial cross-sectional view of a coated glass sheet according an exemplary embodiment.
Figure 12:
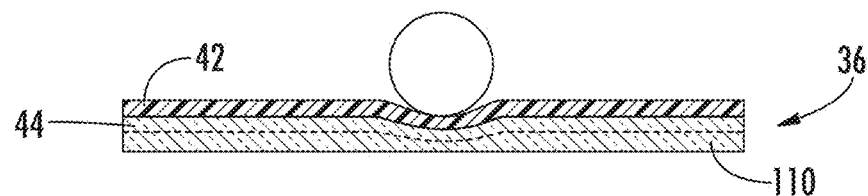
FIG. 12 is a partial cross-sectional view of the coated glass sheet of FIG. 11 under loading according an exemplary embodiment.

Referring to FIGS. 11 and 12, a coated glass article 36 is shown according to an exemplary embodiment including a scratch resistant coating layer. In this embodiment, coating layer 42 is formed from a hard, high modulus material (such as alternate stacking layers of $SiO_2$ and AlON). Further, in this embodiment, glass material 40 has a surface glass layer 110 adjacent to layer 42 that has a relatively low modulus. In some glass articles with hard coatings, the hard, high modulus coating 42 is supported with a somewhat compliant glass layer 110, and under loading or indentation the coating may tend to crack due to stress concentrations that form due to the low level of resistance provided by the upper compliant glass layer. Applicant believes that diffusion zones discussed herein, such as diffusion zone 44, provides a modulus gradient providing a more gradual transition from the hard, high modulus coating 42 and the more compliant glass layer 110, which improves stress distribution under loading and reduces the chance that coating 42 could crack.

As noted above, in some embodiments, cooling zone 16 of system 10 is configured to rapidly cool glass article 26, such as through substantially conductive cooling. In such embodiments, rapid cooling of glass article 26 results in a final, coated glass article 36 with a high fictive temperature at the surface of the article. In some such embodiments, compliant glass layer 110 may have a high fictive temperature resulting in a less dense glass matrix within layer 110, which Applicant believes may alter how force is distributed under impact. Further, the high fictive temperature at the surface of glass layer 110 interfacing with hard layer 42 is also believed to limit the ability of a crack that forms in coating layer 42 from propagating across the interface into glass material 40, and this in turn limits the chance that the glass article is weakened by a crack in coating layer 42. This is in contrast to typical hard coated articles in which cracks within the coating layer tend to propagate into the glass article thereby weakening the glass. Thus, Applicant believes that by utilizing the high-fictive temperature article formed by the rapid cooling provided by cooling zone 16, a hard coating layer 42 may be applied without compromising glass strength.

In particular embodiments, final coated glass article 36 has a fictive temperature at the surface interfacing with coating layer 42 of at least 50° C. above a glass transition temperature of glass material 40. According to an exemplary embodiment, glass article 36 has a portion thereof, such as at or near the major surfaces of article 36, that has a particularly high fictive temperature, such as at least 500° C., such as at least 600° C., or even at least 700° C. in some embodiments. In some such embodiments, glass article 36 is formed from soda-lime glass (SLG). According to an exemplary embodiment, glass article 36 has a portion thereof, such as at or near the major surfaces of article 36, that has a particularly high fictive temperature relative to annealed glass of the same chemical composition, such as at least 10° C. greater, at least 30° C. greater, at least 50° C. greater, at least 70° C. greater, or even at least 100° C. greater. High fictive temperature may be achieved by the presently disclosed inventive technology at least in part due to the rapid transition from the heating to the cooling zones in the strengthening system and the high rate of cooling within cooling zone 16. Applicant believes that high fictive temperature may correspond or relate to increased damage resistance of glass. Surface fictive temperatures may be determined by any suitable method, including differential scanning calorimetry, Fourier transform infrared spectroscopy, Brillouin spectroscopy, or Raman spectroscopy.

Figure 13:
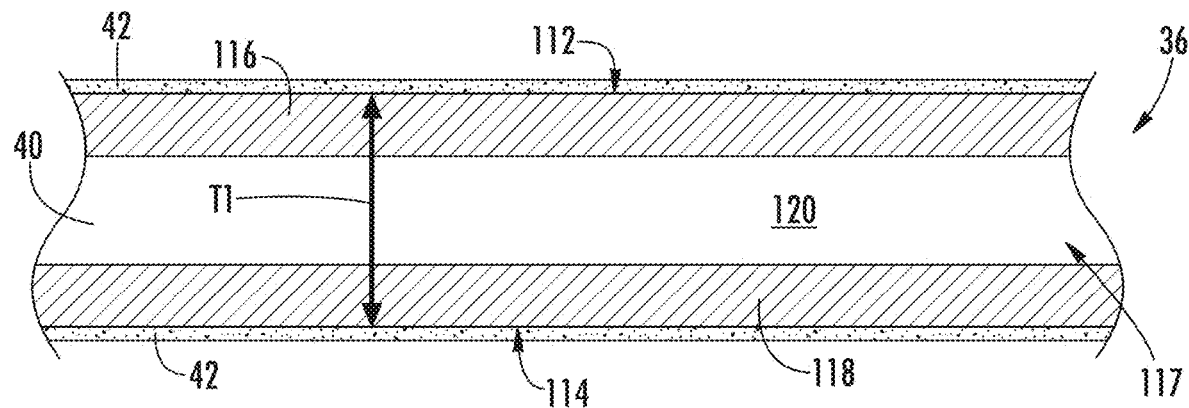
FIG. 13 is a partial cross-sectional view of a coated, thermally tempered glass sheet according an exemplary embodiment.
Figure 14:
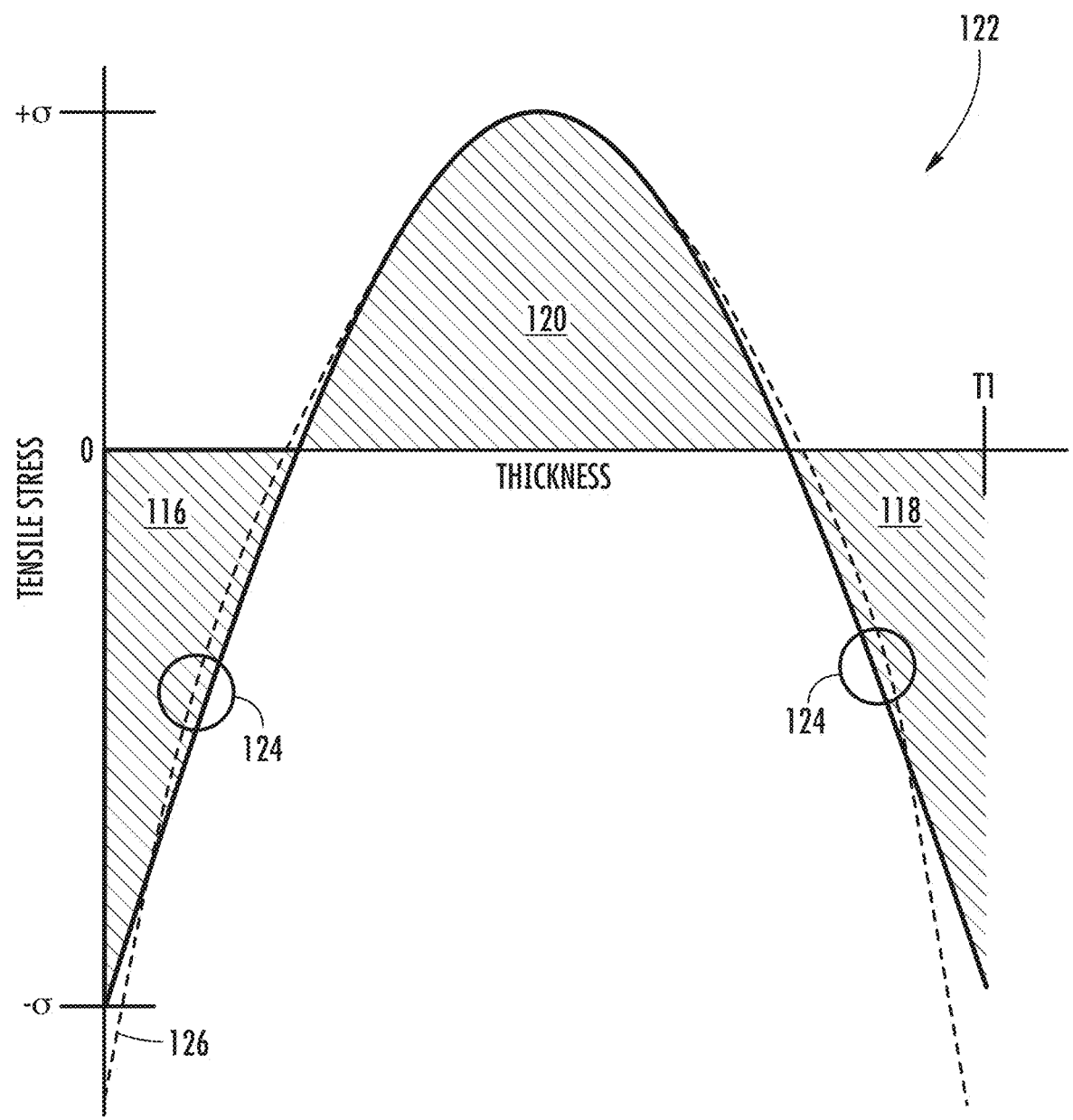
FIG. 14 is a graphical representation of estimated tensile stress versus thickness for a glass or glass-ceramic article according to an exemplary embodiment.

Referring to FIGS. 13 and 14, a coated glass article 36 is shown according to an exemplary embodiment in which cooling within cooling zone 16 occurs at a high rate of heat transfer, primarily through conduction as discussed above. In particular, FIG. 13 shows a diagrammatic partial cross-section of thermally strengthened sheet of glass material 40 having a high surface compressive stress and/or a high central tension, according to an exemplary embodiment.

As shown in FIG. 13, a strengthened glass article 36 (e.g., sheet, beam, plate), includes a first major surface 112, a second major surface 114 and a body 117 extending therebetween. The second major surface 114 is on an opposite side of the body 117 from the first major surface 112 such that a thickness T1 of article 36 is defined as a distance between the first and second major surfaces 112, 114. As will be understood, article 36 also includes a width that is defined as a first dimension of one of the first or second major surfaces 112, 114 orthogonal to the thickness T1 and a length that is defined as a second dimension of one of the first or second major surfaces 112, 114 orthogonal to both the thickness T1 and the width.

In exemplary embodiments, thickness T1 of glass article 36 is less than the length and/or width of glass article 36. As shown in FIG. 13, glass article 36 further has regions of permanent thermally induced compressive stress 116 and 118 at and/or near the first and second major surfaces 112, 114, balanced by a region of permanent thermally induced central tensile stress 120 (i.e., tension) in the central portion of the sheet.

System 10 and the related processes may be used to coat and strengthen glass sheets or articles having a wide variety of thickness ranges. In various embodiments, thickness T1 of glass article 36 ranges from 0.1 mm to 5.7 or 6.0 mm, including, in addition to the end point values, 0.2 mm, 0.28 mm, 0.4 mm, 0.5 mm, 0.55 mm, 0.7 mm, 1 mm, 1.1 mm, 1.5 mm, 1.8 mm, 2 mm, and 3.2 mm. Contemplated embodiments include thermally strengthened glass articles 36 having thicknesses T1 in ranges from 0.1 to 20 mm, from 0.1 to 16 mm, from 0.1 to 12 mm, from 0.1 to 8 mm, from 0.1 to 6 mm, from 0.1 to 4 mm, from 0.1 to 3 mm, from 0.1 to 2 mm, from 0.1 to less than 2 mm, from 0.1 to 1.5 mm, from 0.1 to 1 mm, from 0.1 to 0.7 mm, from 0.1 to 0.5 mm and from 0.1 to 0.3 mm.

In some embodiments, glass sheets of 3 mm or less in thickness are used. In some embodiments, the glass thickness is about (e.g., plus or minus 1%) 8 mm or less, about 6 mm or less, about 3 mm or less, about 2.5 mm or less, about 2 mm or less, about 1.8 mm or less, about 1.6 mm or less, about 1.4 mm or less, about 1.2 mm or less, about 1 mm or less, about 0.8 mm or less, about 0.7 mm or less, about 0.6 mm or less, about 0.5 mm or less, about 0.4 mm or less, about 0.3 mm or less, or about 0.28 mm or less. In various embodiments, glass article 36 has a thickness T1 that is thinner than 5 cm, such as 2.5 cm or less, 1 cm or less, 5 mm or less, 2.5 mm or less, 2 mm or less, 1.7 mm or less, 1.5 mm or less, 1.2 mm or less, or even 1 mm or less in contemplated embodiments, such as 0.8 mm or less; and/or the thickness T1 is at least 10 µm, such as at least 50 µm, at least 100 µm, at least 300 µm.

In some embodiments, thermally strengthened glass sheets have high aspect ratios, i.e., the length and width to thickness ratios are large. Because the thermal tempering processes discussed herein do not rely on high pressures or large volumes of air, various glass sheet properties, such as surface roughness and flatness, can be maintained after tempering by the use of gas bearings and high thermal transfer rate systems discussed herein. Similarly, the thermal tempering processes discussed herein allow high aspect ratio glass sheets (i.e., glass sheets with high ratio of length to thickness, or of width to thickness, or both) to be thermally strengthened while retaining the desired or necessary shape. Specifically, sheets with length to thickness and/or width to thickness ratios ("aspect ratios") of approximately at least 10:1, at least 20:1, and up to and over 1000:1 can be strengthened. In contemplated embodiments, sheets with aspect ratios of at least 200:1, at least 500:1, at least 1000:1, at least 2000:1, at least 4000:1 can be strengthened. According to an exemplary embodiment, the length of strengthened glass article 36 is greater than or equal to the width, such as greater than twice the width, greater than five times the width, and/or no more than fifty times the width. In some such embodiments, the width of strengthened glass article 36 is greater than or equal to the thickness T1, such as greater than twice the thickness T1, greater than five times the thickness T1, and/or no more than fifty times the thickness T1.

In some embodiments, such as in glass for building windows, car windows, displays, etc., the length of glass article 36 is at least 1 cm, such as at least 3 cm, at least 5 cm, at least 7.5 cm, at least 20 cm, at least 50 cm, and/or no more than 50 m, such as no more than 10 m, no more than 7.5 m, no more than 5 m. In some such embodiments, the width of glass article 36 is at least 1 cm, such as at least 3 cm, at least 5 cm, at least 7.5 cm, at least 20 cm, at least 50 cm, and/or no more than 50 m, such as no more than 10 m, no more than 7.5 m, no more than 5 m.

In some embodiments, at least one of the first or second surfaces 112, 114 of glass article 36 has a relatively large surface area. In various embodiments, first and/or second surfaces 112, 114 having areas of at least 100 mm$^2$, such as at least 900 mm$^2$, at least 2500 mm$^2$, at least 5000 mm$^2$, at least 100 cm$^2$, at least 900 cm$^2$, at least 2500 cm$^2$, at least 5000 cm$^2$, and/or no more than 2500 m$^2$, such as no more than 100 m$^2$, no more than 5000 cm$^2$, no more than 2500 cm$^2$, no more than 1000 cm$^2$, no more than 500 cm$^2$, no more than 100 cm$^2$. As such, glass article 36 may have a relatively large surface area, which, except by the conductive thermal tempering discussed herein, may be difficult or impossible to thermally strengthen particularly while having the thicknesses, surface qualities, and/or strain homogeneities of the glass sheets discussed herein. Further, except by methods and systems disclosed herein, it may be difficult or impossible to achieve the stress profile, particularly the negative tensile stress portion of the stress profile (see generally FIG. 14), without relying upon ion-exchange or a change in the type of glass.

As noted above, the non-contact nature of system 10 produces a glass article having surfaces with high levels of flatness compared to at least some other high temperature, contact-based coating systems. In various embodiments, the coating system discussed herein utilizes controlled gas bearings to support the glass material during transporting, heating and coating formation, and in some embodiments, can be used to assist in controlling and/or improving the flatness of the glass sheet or coating, resulting in a higher degree of flatness than previously obtainable, particularly for thin and/or highly strengthened glass sheets. The flatness of coated and/or thermally strengthened glass sheets embodied herein can comprise 100 µm or less total indicator run-out (TIR) along any 50 mm length along one of the first or second surfaces thereof, 300 µm TIR or less within a 50 mm length on one of the first or second surfaces, 200 µm TIR or less, 100 µm TIR or less, or 70 µm TIR or less within a 50 mm length on one of the first or second surfaces. In exemplary embodiments, flatness is measured along any 50 mm or less profile of the glass sheet. In contemplated embodiments, sheets with thickness disclosed herein have flatness 200 µm TIR or less within a 20 mm length on one of the first or second surfaces, such as flatness 100 µm TIR or less, flatness 70 µm TIR or less, flatness 50 µm TIR or less.

As noted above, the thermally strengthened glass sheets discussed herein may have surprisingly high surface compressive stresses, e.g., in regions 116, 118 shown in FIG. 13, surprisingly high central tensile stresses, e.g., in region 120 shown in FIG. 13, and/or unique stress profiles (see FIG. 14). This is particularly true considering the low thickness and/or other unique physical properties (e.g., very low roughness, high degree of flatness, various optical properties, fictive temperature properties, etc.) of glass article 36 as discussed herein.

Compressive stresses of glasses (e.g., in regions 116, 118 shown in FIG. 13) formed by the conductive tempering processes and systems disclosed herein can vary as a function of thickness T1 of the glasses. In various embodiments, glasses, e.g., glass article 36, having a thickness of 3 mm or less have a compressive stress (e.g., surface compressive stress) of at least 80 MPa, at least 100 MPa, at least 150 MPa, at least 200 MPa, at least 250 MPa, at least 300 MPa, at least 350 MPa, at least 400 MPa, and/or no more than 1 GPa. In contemplated embodiments, glasses having a thickness of 2 mm or less have a compressive stress of at least 80 MPa, at least 100 MPa, at least 150 MPa, at least 175 MPa, at least 200 MPa, at least 250 MPa, at least 300 MPa, at least 350 MPa, at least 400 MPa, and/or no more than 1 GPa. In contemplated embodiments, glasses having a thickness of 1.5 mm or less have a compressive stress of at least 80 MPa, at least 100-MPa, at least 150 MPa, at least 175 MPa, at least 200 MPa, at least 250 MPa, at least 300-MPa, at least 350 MPa, and/or no more than 1 GPa. In contemplated embodiments, glasses having a thickness of 1 mm or less have a compressive stress of at least 80 MPa, at least 100 MPa, at least 150 MPa, at least 175 MPa, at least 200 MPa, at least 250 MPa, at least 300 MPa, and/or no more than 1 GPa. In contemplated embodiments, glasses having a thickness of 0.5 mm or less have a compressive stress of at least 50 MPa, at least 80 MPa, at least 100 MPa, at least 150 MPa, at least 175 MPa, at least 200 MPa, at least 250 MPa, and/or no more than 1 GPa.

In some embodiments, the thermally induced central tension in glasses formed by the processes and systems disclosed herein (e.g., in the region 120 shown in FIG. 14) may be greater than 40 MPa, greater than 50 MPa, greater than 75 MPa, greater than 100 MPa. In other embodiments, the thermally induced central tension may be less than 300 MPa, or less than 400 MPa. In some embodiments, the thermally induced central tension may be from about 50 MPa to about 300 MPa, about 60 MPa to about 200 MPa, about 70 MPa to about 150 MPa, or about 80 MPa to about 140 MPa. In some embodiments, the thermally strengthened glass sheets have high thinness i.e., are particularly thin. Because very high-heat transfer rates can be applied via the systems and methods discussed herein, significant thermal effects, for example central tensions of at least 10 or even at least 20 MPa, can be produced in sheets of soda-lime glass of less than 0.3 mm thickness. In fact, very thin sheets, sheets at least as thin as 0.1 mm, can be thermally strengthened.

Referring to FIG. 14, a conceptual stress profile 122, at room temperature of 25° C. and standard atmospheric pressure, of strengthened glass article 36 of FIG. 13, shows an interior portion 120 of strengthened glass article 36 under positive tensile stress and portions 116, 118 of strengthened glass article 36 exterior to and adjoining the interior portion 120 under negative tensile stress (e.g., positive compressive stress). Applicant believes that the negative tensile stress, at least in part, fortifies strengthened glass article 36 by limiting initiation and/or propagation of cracks therethrough.

Given relatively large surface areas and/or thin thicknesses of strengthened glass article 36 as disclosed herein, tensile stress in the stress profile 122 sharply transitions between the positive tensile stress of the interior portion 120 and the negative tensile stress of the portions 116, 118 exterior to and adjoining the interior portion 120. This sharp transition may be understood as a rate of change (i.e., slope) of the tensile stress which may be expressed as a magnitude of stress (e.g., 100 MPa, 200 MPa, 250 MPa, 300 MPa, 400 MPa, a difference in peak values of the positive and negative tensile stresses $+\sigma$, $-\sigma$) divided by a distance of thickness over which the change occurs, such as a distance of 1 mm, such as a distance of 500 µm, 250 µm, 100 µm (which is the distance used to quantify a rate of change, which may be a portion of article thickness, and not necessarily a dimension of the article geometry). In some such embodiments, the rate of change of the tensile stress does not exceed 7000 MPa divided by 1 mm, such as no more than 5000 MPa divided by 1 mm. In contemplated embodiments, the difference in peak values of the positive and negative tensile stresses is at least 50 MPa, such as at least 100 MPa, at least 150 MPa, at least 200 MPa, at least 250 MPa, at least 300 MPa, at least 400 MPa, at least 500 MPa, and/or no more than 50 GPa. In contemplated embodiments, glass article 36 has a peak negative tensile stress of at least 50 MPa in magnitude, such as at least 100 MPa, at least 150 MPa, at least 200 MPa, at least 250 MPa, at least 300 MPa, at least 400 MPa, at least 500 MPa. The steep tensile curve transitions generated by the system and method discussed herein are believed to be indicative of the ability to achieve higher magnitudes of negative tensile stress at a surface of a glass sheet for a given thickness and/or to manufacture thinner glass articles to a higher degree of negative tensile stress, such as to achieve a fragmentation potential for dicing as disclosed herein. Conventional thermal tempering approaches may be unable to achieve such steep tensile stress curves.

According to an exemplary embodiment, the high rate of change of tensile stress is at least one of the above-described magnitudes or greater sustained over a thickness-wise stretch of the stress profile 122 that is at least 2% of the thickness, such as at least 5% of the thickness, at least 10% of the thickness, at least 15% of the thickness, or at least 25% of the thickness of glass article 36. In contemplated embodiments, the strengthening extends deep into strengthened glass article 36 such that the thickness-wise stretch with the high rate of change of tensile stress is centered at a depth of between 20% and 80% into the thickness from the first surface, which may further distinguish chemical tempering for example.

In at least some contemplated embodiments, strengthened glass article 36 includes a change in the composition thereof in terms of ion content, conceptually shown as dotted line 126 in FIG. 14. More specifically, the composition of strengthened glass article 36 in such embodiments includes exchanged or implanted ions that influence the stress profile 122. In some such embodiments, the exchanged or implanted ions do not extend fully through the portions 116, 118 of strengthened glass article 36 under the negative tensile stress because the negative tensile stress is also a result of the thermal tempering as disclosed herein.

Accordingly, the curve of the tensile stress profile 122 with ion exchange strength augmentation includes a discontinuity or sudden change 124 in direction where tangents of the curve differ from one another on either side of the discontinuity or sudden change 124. The sudden change 124 is located within the portions 116, 118 under negative tensile stress such that the tensile stress is negative on either side immediately adjacent to the discontinuity or sudden change 124. The discontinuity or sudden change 124 may correspond to the depth of the different ion content, however in some such embodiments other parts of the portions 116, 118 under negative tensile stress still have the same composition in terms of ion content as the portion 120 under positive tensile stress.

For at least some strengthened glass articles 36, with or without ion-exchange or implantation, the composition of at least a part of the portions 116, 118 of strengthened glass article 36, which is under the negative tensile stress and is exterior to and adjoining the interior portion 120, is the same as the composition of at least a part of the interior portion 120, which is under the positive tensile stress. In such embodiments, at least some of the negative tensile stress of the stress profile is independent of a change in the composition (e.g., ion composition) of strengthened glass article 36. Such structure may simplify the composition of strengthened glass article 36 at least to a degree by providing sufficient strength without and/or with less chemical tempering. In a particular embodiment, glass article is not chemical tempered such that composition of glass material 40 is consistent (at least interior of coating diffusion zone 44).

Specific Coating Examples

SiO$_2$ Nanoparticles

Figure 15:
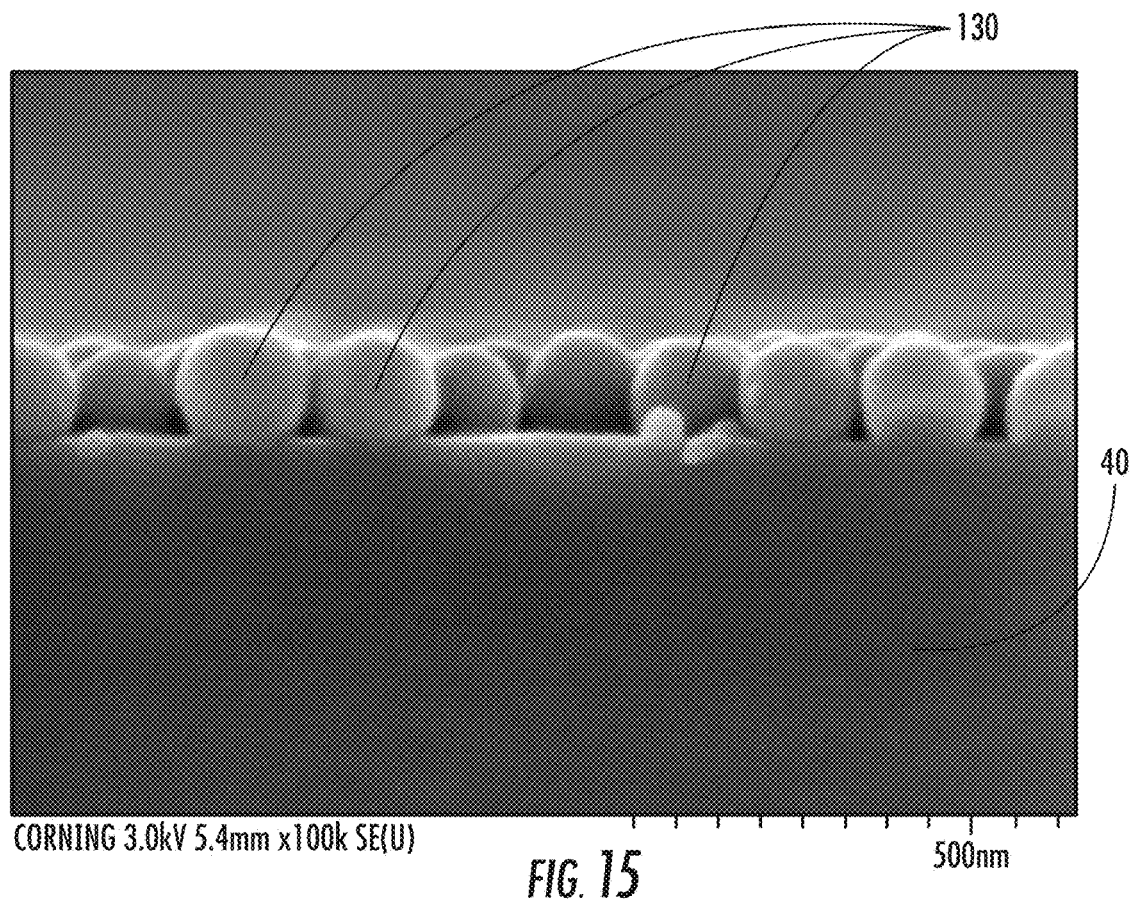
FIG. 15 is an SEM image of $SiO_2$ particles coated on a glass sheet according to an exemplary embodiment.

In various embodiments, coating layer 42 may be formed from SiO$_2$ microparticles and/or nanoparticles. In one test, samples were prepared by spin coating (0-500 rpm in 5 sec, 500 rpm for 10 sec dwell, 500-1000 rpm in 5 sec, 1000 rpm for 30 second dwell) a diluted solution of Snowtex SiO$_2$ particles, available from Nissan Chemicals, from 30 wt % to 5 wt % using deionized water, onto a sheet of Coring® Gorilla® Glass. The samples were dried in an oven prior to use. The three samples were run through a non-contact heating/cooling system, such as system 10, and specifically were heated within a non-contact heating zone, such as heating zone 12, at 820 degrees C., for 10, 20 or 30 seconds. The samples were washed (Crestline) before analysis with SEM. FIG. 15 shows an SEM image of the 30 second sample. As can be seen in FIG. 15, the SiO$_2$ particles 130 fuse and embed into the surface of the glass material 40. In particular embodiments, SiO$_2$ particles 130 may function as an anti-glare coating.

Silver and/or Copper Salts

Figure 16:
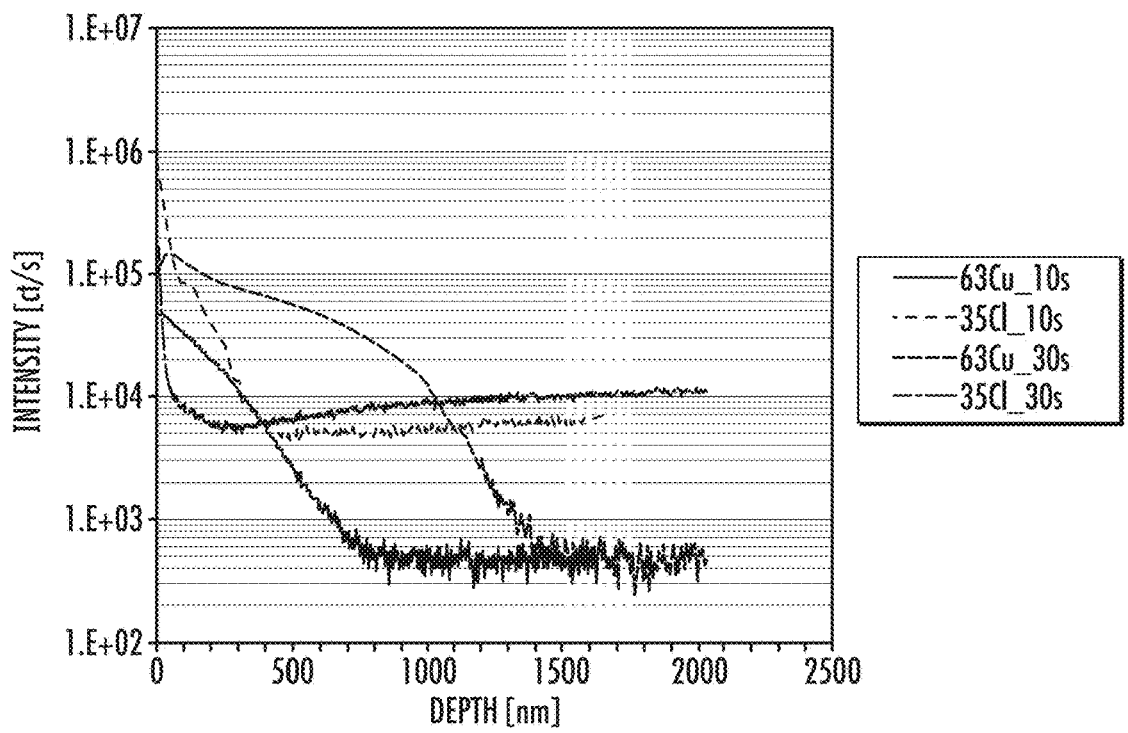
FIG. 16 is a DSIMS plot showing Cu and Cl diffusion into glass sheets coated according to exemplary embodiments.

In various embodiments, coating layer 42 may be formed from a metal ion solution such as, a Ag or Cu salt solution, that diffuses into the glass material. In some embodiments, this may form an anti-microbial surface, and in yet other embodiments, the coating may add a slight colored tint to the coated glass. In one test, Copper(I) chloride (0.5 wt %) was dispersed in an aqueous solution using a PVP binder (polyvinylpyrrolidone, 5 wt % relative to CuCl). The dispersion was coated onto a sheet of Coring® Gorilla® Glass by spin coating. The three samples were run through a non-contact heating/cooling system, such as system 10, and specifically heated within a non-contact heating zone, such as heating zone 12, at 820 degrees C., for 10, 20 or 30 seconds. The samples were washed (Crestline) before analysis with DSIMS. Diffusion profiles of the samples were analyzed using DSIMS at regions of the glass where high levels copper salt precipitate were detected and at regions where low levels of copper salt precipitate were detected. FIG. 16 shows a DSIMS analysis of the sample and shows substantial Cu(I) diffusion to a depth of approximately 800 nm in the 10 second heated sample within the precipitate regions and to a depth of approximately 1400 nm in the 30 second heated sample within the precipitate regions. Lower diffusion rates of Cu(II) were found under the same test procedures using Cu(II)SO$_4$ solution.

BN Coating

Figure 17:
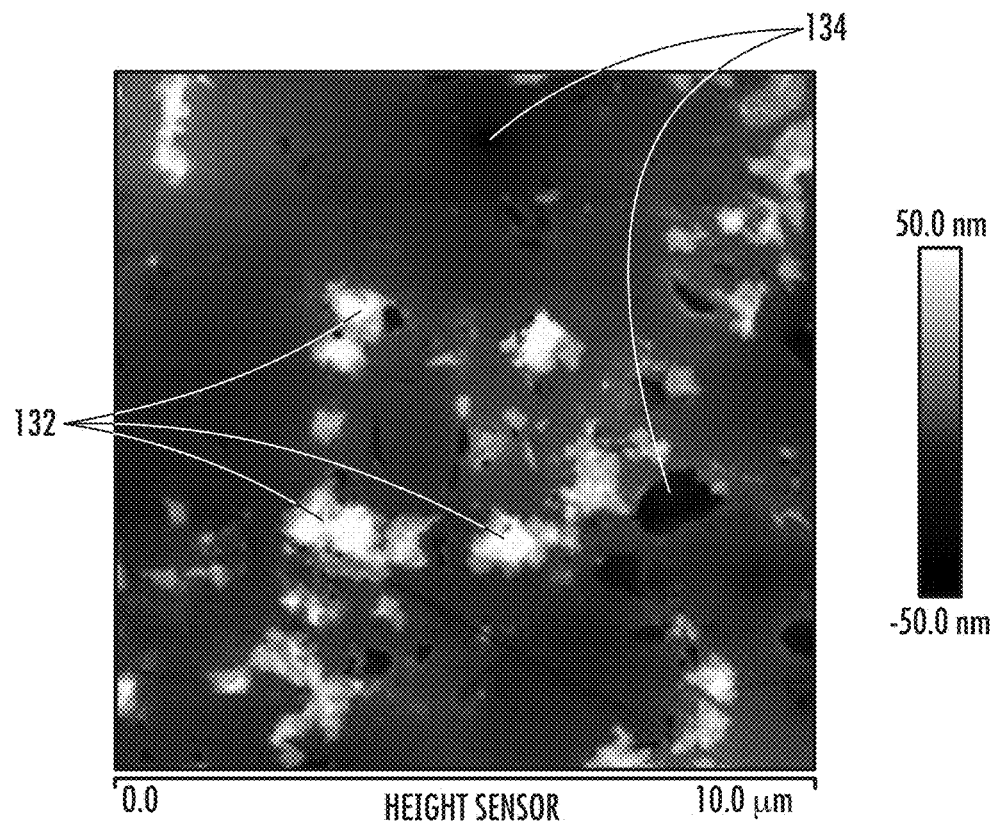
FIG. 17 is an AFM topographical image showing BN particles coated on a glass sheet according to an exemplary embodiment.

In various embodiments, coating layer 42 may be formed from a BN precoating or BN particle coating. In various embodiments, following heating, B diffusion into the glass makes it water-soluble, and further, the remaining BN may be rinsed following heating leaving a textured surface. In one test, BN was sprayed from a can BN source, and the coated glass was run through a non-contact heating/cooling system, such as system 10, and specifically heated within a non-contact heating zone, such as heating zone 12, at a temperature of 670-700 degrees C. for between 10-15 seconds. FIG. 17 shows atomic force microscopy (AFM) image showing topography of the glass following washing which shows BN particle peaks 132 having heights of approximately 50 nm, and depressions 134 believed to be formed from removed BN particles having depths of approximately 50 nm. This is in comparison to the uncoated glass that has maximum peaks of about 2.5 nm and minimum depression of about 2.5 nm. In particular embodiments, the BN particulate coating shown in FIG. 17 may function as an anti-glare coating.

TiO$_2$, ZnO$_2$ and/or AZO Coatings

Figure 18:
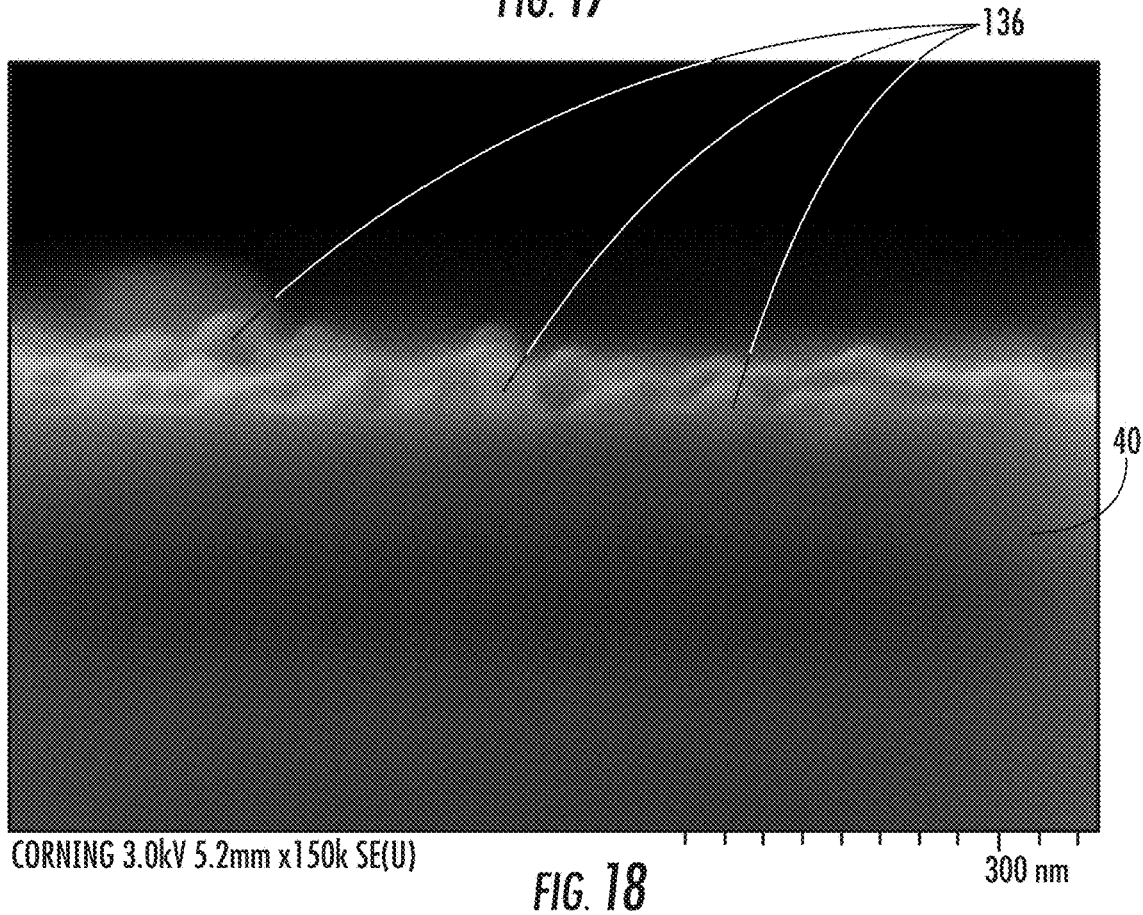
FIG. 18 is an SEM image of $TiO_2$ particles coated on a glass sheet according to an exemplary embodiment.

In various embodiments, coating layer 42 may be formed from a TiO$_2$, a ZnO$_2$ and/or an aluminum-doped ZO (AZO) material. In particular embodiments, TiO$_2$ is applied using a binder material, and AZO is sputter coated. In such embodiments, the particles are sunk into the surface and/or diffuse into the glass material during heating within heating zone 12. In one test, 5% TiO$_2$ was applied to a sheet of Coring® Gorilla® Glass. The sample was run through a non-contact heating/cooling system, such as system 10, and specifically heated within a non-contact heating zone, such as heating zone 12, at 820 degrees C., for 20 seconds. FIG. 18 shows an SEM image of the sample. As can be seen in FIG. 18, the $TiO_2$ particles 136 fuse and embed into the surface of glass material 40.

Figure 19:
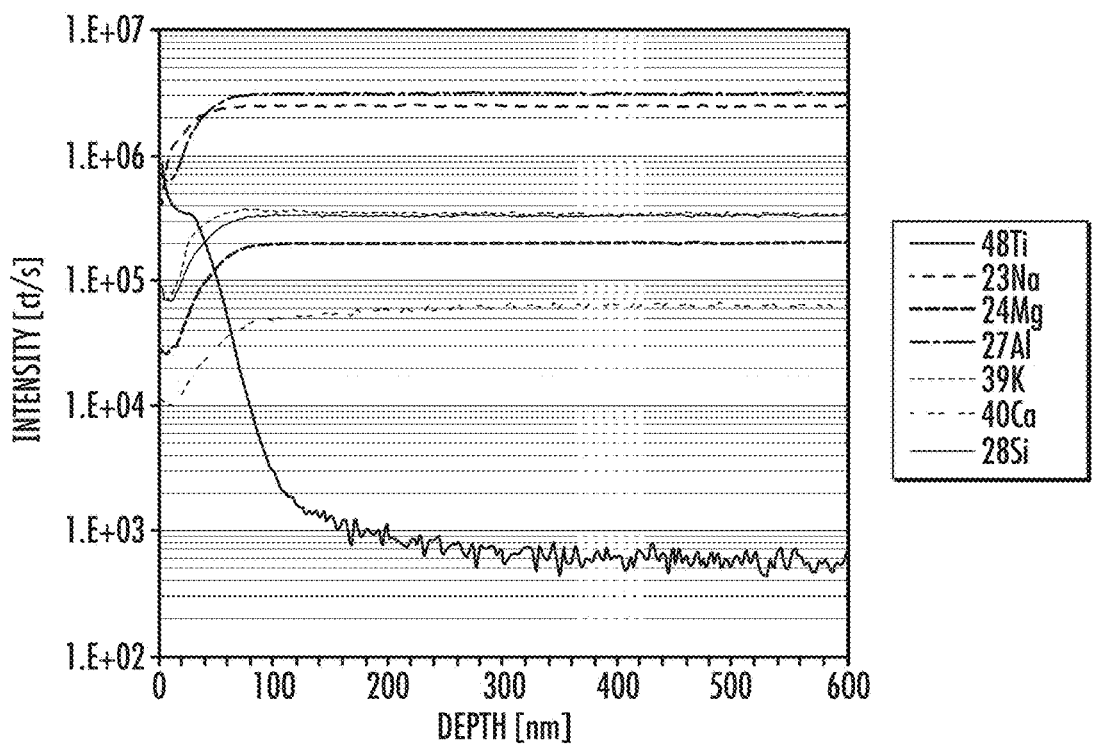
FIG. 19 is a DSIMS plot showing Ti diffusion into glass sheets coated according to an exemplary embodiment.

FIG. 19 shows a DSIMS analysis of the sample and shows substantial Ti diffusion to a depth of approximately 150 nm in the sample. The other plots in FIG. 19, Na, Mg, Al, K, Ca, and Si plots, are components of the glass material showing substantially constant concentrations outside of the Ti diffusion zone. In particular embodiments, the Ti diffusion zone may be used to improve glass strength, and in such embodiments, the Ti coating is believed to increase surface compression of the glass material following cooling.

Figure 20:
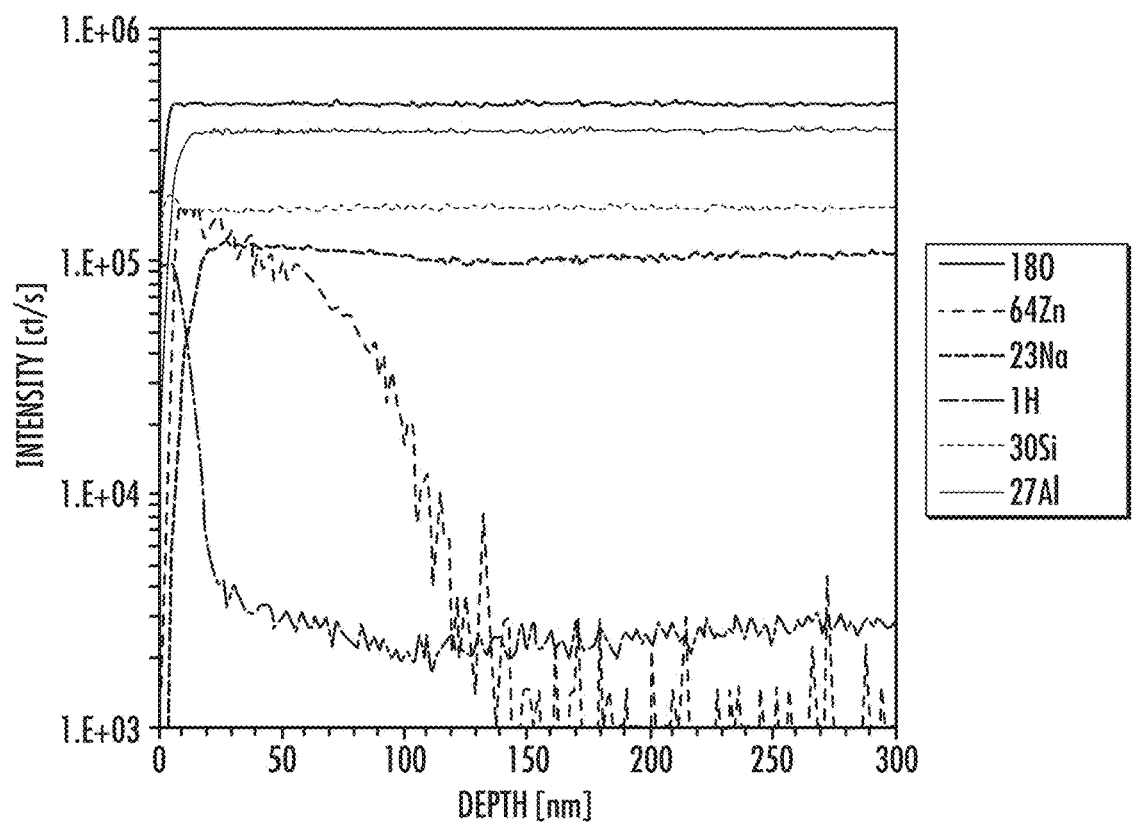
FIG. 20 is a DSIMS plot showing Zn diffusion into glass sheets coated according to an exemplary embodiment.

In another test, a sheet of Coring® Gorilla® Glass was sputter coated with AZO-Zinc oxide with 1% aluminum doping. The sample was run through a non-contact heating/cooling system, such as system 10, and specifically heated within a non-contact heating zone, such as heating zone 12, at 820 degrees C., for 20 seconds. The AZO coating was etched using a 5-10% aqueous acetic acid solution. FIG. 20 shows a DSIMS analysis of the sample and shows substantial Zn diffusion to a depth of approximately 100 nm in the sample, and the other plots in FIG. 20, the O, Na, H, Si, and Al plots, are components of the glass material showing substantially constant concentrations outside of the Zn diffusion zone.

Lithium Salts

In various embodiments, the system and process discussed herein allows for diffusion of lithium ions into the glass material due to the heating of the glass article above the strain point within heating zone 12. This process is believed to allow for Li ion diffusion into the glass without the cracks or damage that is typically associated with standard coating techniques. In some embodiments, a lithium ion coating and/or diffusion zone imparts a water diffusion barrier into the glass and renders the glass more chemically stable. In some embodiments, this process also provides for Li ion-exchange that produces high surfaces compression stresses (e.g., higher than potassium ion-exchange typically used for glass tempering). As one example if this was done on a sodium glass, now some of the surface exchange would be Li—K resulting in higher compressive stress.

Low Emissivity and Solar Control Coatings

As discussed herein, coating layers, such as layers 42, may be a wide variety of low emissivity coatings. In one embodiment, the low emissivity coating is a multi-layer coating having a first layer of $SnO_2$, a second layer of $SiO_2$ and a fluorine doped $SnO_2$ layer. In a particular embodiment, the low emissivity coating layer 42 includes a 25 nm layer of $SnO_2$, a 25 nm layer of $SiO_2$ and a layer of 1% F doped $SnO_2$ have a thickness of about (e.g., plus or minus 1%) 0.5 μm. In such embodiments, the first two 25 nm layers act to minimize iridescence of the fluorine doped tin oxide layer by displacing it from the surface. In addition, $SnO_2$ coatings can also provide abrasion resistances and can be used as hot end coating for containers.

In other embodiments, coating layers discussed herein may be a solar control coating including mixed oxides of cobalt, iron and chromium that absorb both visible and infrared light as described in U.S. Pat. No. 3,850,679, which is incorporated herein by reference in its entirety, and such coatings may have a neutral grey color or muted color. In other embodiments, coating layers discussed herein may be a solar control coating including titanium nitride, and/or titanium silicide or silicon, which reflect light and heat with less absorption than metal oxides. In some embodiments, a top layer of tin oxide may protect the titanium nitride, and/or titanium silicide or silicon layers. Various additional coatings are described in U.S. Pat. No. 4,690, 871 and U.S. Pat. No. 5,057,375, which are incorporated herein by reference in their entireties.

Amorphous and/or Polycrystalline Silicon

In various embodiments, Applicant believes that the system and method discussed herein can be used to form coatings of amorphous silicon (a-Si) and/or polycrystalline silicon (p-Si). In such embodiments, system 10 may be used to react silane gas, $SiH_4$, which has deposition rates that are typically fast at glass temperatures of ~650° C. to produce amorphous silicon (a-Si). Higher temperatures result in polycrystalline silicon (p-Si). Glass with such coatings may be used in various applications, such as OLED applications.

$SiO_2$ Film Deposition

In various embodiments, Applicant believes that the system and method discussed herein can be used to form $SiO_2$ film coatings. In such an embodiment, system 10 utilizes the presence of oxygen with silane gas. As the material is pyrophoric, a low concentration of silane will be used to result in film formation rather than powder (particular) formation. Ethylene (radical traps) can be used but typically use glass temperatures of 600° C. or above. Silicon suboxides with larger refractive indices (up to 2 as opposed to 1.45) can be produced by using silane in the presence of carbon dioxide or nitrous oxide rather than oxygen. For soda-lime glass or other sodium containing glasses, dichlorosilane can react in the presence of oxygen to produce $SiO_2$ films. TEOS (tetraethylorthosilicate) can react with oxygen to form $SiO_2$ but with reaction rate that is slow below 700° C., and thus in embodiments utilizing TEOS, heating zone 12 operates above 700° C. For some glass materials that utilize higher temperatures for tempering (such as Gorilla glasses, display glass substrates), a $SiO_2$ film may be deposited utilizing TEOS which may be deposited with or without use of triethylphosphite to accelerate the reaction. In other embodiments, other organic silanes can also be used for appropriate temperature ranges and reaction kinetics as may be used for tempering of glasses of differing softening points.

Other Metal Oxide Coatings

In other embodiments, organometallic precursors (including triethyl-dialuminum tri-sec-butoxide for aluminum oxide) can be used to produce corresponding metal oxides coatings.

Ag Coating

In one embodiment, system 10 may be used to form a glass article having a metallic coating, such as an Ag coating. In such an embodiment, metal nanoparticles are coated onto the glass, and the glass is heated within heating zone 12 which allows the nanoparticles to partially or fully sink or embed into the glass surface. To prevent oxide formation, a nonoxidizing environment may be used unless a metal oxide coating is the desired end product. Alternatively, metal ions can be coated onto the glass surface with or without a binder and subsequently heated with heating zone 12 in a reducing environment to reduce the metal ions to its metallic form.

TiN, $TiSi_2$

In various embodiments, because carbon dioxide and nitrous oxide can be used to tune reaction/deposition rates of various metal oxides, metal nitrides can be made by utilizing nitrogen containing gases such as ammonia with heating zone 12. In one such embodiment, titanium nitride can be formed on glass substrates that are heated to temperatures above 500° C. within heating zone 12 in the presence of a nitrogen containing gas. Similarly in another embodiment, reaction of $TiCl_4$ with $SiH_4$ with glass article 26 within heating zone 12 will result in a titanium silicide coating formed on glass article 26 when heated to a temperature of 600-650° C. within heating zone 12.

$SiO_2$ and AlON Multi-Layer Coating

In various embodiments, alternate stacking layers of $SiO_2$ and AlON can be deposited on a hot glass article 26 to produce a scratch resistant coating comprising of $SiO_2$ and AlON or other metal oxide/oxynitride/nitride stacked structures. To produce multi-layer coatings different precursors may be introduced onto the glass sequentially, such as utilizing the multi-stage coating system shown in FIG. 3 above. In other embodiments, anti-reflective coatings multilayers can be produced utilizing a similar coating strategy of alternate layers of high and low refractive index materials.

Hermetic Carbon Coating

In various embodiments, coating layer 42 may be a hermetic carbon coating layer. In various embodiments, hermetic carbon coating formation uses high temperatures (700-1000° C.), and Applicant believes that conventional coating processes limits such coatings to high melt temperature substrates. In various embodiments, heating zone 12 is capable of heating the glass article, such as article 26, to greater than 100° C. above Tg of the glass while the air bearing supports the article at these temperatures with minimal distortion allowing for hermetic carbon coating formation.

In some contemplated embodiments, a coated glass article, as disclosed herein, includes a glass article formed from glass material. The glass material at least primarily includes a glass and/or glass-ceramic, as disclosed herein. In some such embodiments, the glass article has a first major surface and includes a diffusion zone. The diffusion zone has a coating material extending into the glass material of the glass article from the first major surface of the glass article and toward a center of the glass article. Within the diffusion zone, concentration of the coating material decreases as depth into the glass article increases (e.g., linearly, exponentially, generally, in a non-uniform manner), where the diffusion zone has a depth from the first major surface of the glass article toward a widthwise center of the glass article of greater than 50 nm, such as greater than 100 nm, greater than 150 nm, and/or no more than halfway through the article, such as no more than 25% of the width of the article. In other contemplated embodiments, the depth of the diffusion zone may be 50 nm or less.

At least in part due to processes disclosed herein, an exterior surface of the coated glass article facing away from the first major surface of the glass article is generally flat despite diffusion of the coating into the first major surface. Such an article may be surprising or counter-intuitive to those of skill in the art because coatings that diffuse into glass materials, as disclosed herein, such as lithium or copper, may require heating of the glass material above a glass transition temperature of the glass material in order for the coating to diffuse, such as to a depth of at least 50 nm. Such heating and softening of the glass material may typically be expected to deform the underside of the coated glass article, which may traditionally be supported by a solid surface, such as a setter board, that may deform and/or adhere to the exterior surface of the coated glass article facing away from the first major surface of the glass article. However, due to technology disclosed herein, the exterior surface of the coated glass article facing away from the first major surface of the glass article may be flat to at least 50 μm total indicator run-out along a 50 mm profile and/or along a profile fully across the exterior surface facing away from the first major surface, such as to at least 40 μm total indicator run-out, and/or at least 30 μm total indicator run-out. In other such embodiments, the exterior surface facing away from the first major surface may not be so flat.

The coating material and the glass material, according to at least some of such embodiments, are related to one another such that diffusion of the particular coating material into the particular glass material to a depth of greater than 50 nm (e.g., greater than 75 nm, greater than 100 nm), without cracking the glass material, requires heating the glass material to at least a glass transition temperature of the glass. In contemplated embodiments, the coating material is or includes copper and/or lithium and the glass material is a soda lime glass. In other contemplated embodiments, the coating material is or includes some or any of the other coatings disclosed herein and/or some or any of the glass materials disclosed herein.

The coated glass article of claim 26, wherein the coating material and the glass material are such that diffusion of the coating material into the glass material to a depth of greater than 50 nm, without cracking the glass material, requires heating the glass material to at least a glass transition temperature of the glass.

According to an exemplary embodiment, an exterior surface of the coated glass article facing away from the first major surface of the glass article has at least a square centimeter of area (e.g., at least 3 $cm^2$, at least 10 $cm^2$, at least 50 $cm^2$, such as the size of a window, and/or no more than at least 10 $m^2$) and/or all of the area thereof having fewer than ten surface defects (e.g., fewer than 5 such surface defects, 2 or fewer such surface defects) from adhesion and/or abrasion with a dimension greater than five micrometers (e.g., greater than 7 μm, greater than 10 μm, and/or no more than 1 cm; or alternatively greater than 50 nm, greater than 100 nm, and/or no more than 100 μm) and, in some such embodiments, a maximum depth of at least 50 nm relative to adjoining portions the exterior surface facing away from the first major surface, such as at least 100 nm, such as at least 150 nm. Such a high quality back surface of the coated glass article may be surprising for articles disclosed herein, particularly for thin articles disclosed herein, where back side surface damage may a limitation of conventional coated glass articles where the articles are supported during the coating process and the support causes defects that may limit the functionality or usefulness of the coated glass articles.

According to an exemplary embodiment, technology disclosed herein facilitates manufacture of a coated glass article having a coating on opposing major faces of the article where the coating diffuses into the article to about the same depth on each side. Such an article may be unexpected to those of skill in the art that rely on separate heating cycles to coat both sides of a glass article so that the coating diffuses into the article because the coating may be applied and diffused first into one side, with the article then flipped and reheated to diffuse coating into the second side, resulting in continued diffusion of the first coating into the article and the coatings on opposing sides diffusing to substantially different depths from one another. Such asymmetry may require marking or otherwise denoting of the deeper-diffused coating for consistent use of such coated glass articles and/or may cause stresses that influence (e.g., lessen) the strength of the respective coated glass articles and/or warp the respective coated glass articles. However, in at least some contemplated embodiments, coating(s) may be applied simultaneously and/or diffused simultaneously on opposing sides of a glass article as disclosed herein.

According to an exemplary embodiment, a coated glass articles includes a glass article that has a first major surface and a second major surface opposite the first major surface. The coated glass article further includes first coating layer located on the first major surface, where the first coating layer is formed from a material different than material of the glass article, such as a diffused combination of a coating material as disclosed herein and glass material, or only the coating material. In some such embodiments, the first coating layer including a first diffusion zone located within the material of the glass article extending from an interface between the first coating layer and the glass article toward a center of the glass article. The interface may be the first surface of the glass article. In some embodiments, within the first diffusion zone, a concentration of a material of the first coating layer decreases as the depth into the glass article increases, as disclosed herein. The coated glass material in some such embodiments further includes a second coating layer located on the second major surface, where the second coating layer is also formed from a material different than the glass material of the glass article, such as the same material as the first coating layer and/or any other coating material disclosed herein. In some embodiments, the second coating layer likewise includes a second diffusion zone located within the material of the glass article and extending from an interface (e.g., second major surface) between the second coating layer and the glass article toward the center of the glass article. Within the second diffusion zone, a concentration of the material of the second coating layer decreases as the depth into the glass article increases. According to an embodiment, the first and second diffusion zones each have a depth greater than 50 nm, such as greater than 100 nm, such as greater than 150 nm. At least in part due to technology disclosed herein, the depth of the second diffusion zone is within 30% of the depth of the first diffusion zone, such as within 20%, within 10%, within about 5%, and/or even closer to even in depth, providing an improved symmetry to the coated glass article relative to coated glass articles that are asymmetric due to other manufacturing processes.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A coated glass article comprising:
   a glass article comprising:
   a first major surface;
   a second major surface opposite the first major surface; and
   glass material of at least 50% silicon dioxide by weight; and
   a first coating layer located on the first major surface, the first coating layer formed from a material different than the glass material of the glass article, the first coating layer including a first diffusion zone located within the glass material of the glass article extending from an interface between the first coating layer and the glass article toward the center of the glass article, wherein within the first diffusion zone a concentration of the material of the first coating layer decreases as the depth into the glass article increases and wherein within the first diffusion zone a Young's modulus of elasticity of the glass article decreases as the depth into the glass article increases;
   wherein the first diffusion zone has a depth greater than 50 nm; and
   wherein the first and second major surfaces are flat to at least 50 μm total indicator run-out along a 50 mm profile of the first and second major surfaces.

2. A coated glass article, comprising:
   a glass article formed from glass material at least primarily including at least one of a glass or a glass-ceramic, the glass article comprising a first major surface;
   a coating layer disposed on the first major surface of the glass article, the coating layer formed from a coating material and the coating layer defining an exterior surface of the coated glass article facing away from the first major surface of the glass article;
   a diffusion zone comprising the coating material extending into the glass material of the glass article from the first major surface of the glass article and toward a center of the glass article;
   wherein, within the diffusion zone, concentration of the coating material decreases as depth into the glass article increases, wherein the diffusion zone has a depth from the first major surface of the glass article toward the center of the glass article of greater than 50 nm; and
   wherein the exterior surface is flat to at least 50 μm total indicator run-out along at least one of a 50 mm profile or a profile fully across the exterior surface facing away from the first major surface.

3. The coated glass article of claim 2, wherein the coating material and the glass material are such that diffusion of the coating material into the glass material to a depth of greater than 50 nm, without cracking the glass material, requires heating the glass material to at least a glass transition temperature of the glass.

4. The coated glass article of claim 2, wherein the coating material comprises lithium or copper and the glass material comprises a soda lime glass.

5. The coated glass article of claim 2, wherein the coating layer has a thickness of 1 nm to 1000 nm extending from the first major surface away from the diffusion zone.

6. A coated glass article, comprising:
   a glass article formed from glass material at least primarily including at least one of a glass or a glass-ceramic, the glass article comprising a first major surface;
   a coating layer disposed on the first major surface of the glass article, the coating layer formed from a coating material and the coating layer defining an exterior surface of the coated glass article facing away from the first major surface of the glass article;
   a diffusion zone comprising the coating material extending into the glass material of the glass article from the first major surface of the glass article and toward a center of the glass article;

wherein, within the diffusion zone, concentration of the coating material decreases as depth into the glass article increases, wherein the diffusion zone has a depth from the first major surface of the glass article toward a widthwise center of the glass article of greater than 50 nm; and wherein the exterior surface is flat to at least 50 μm total indicator run-out along at least one of a 50 mm profile of a second major surface or a profile fully across the exterior surface;

wherein the exterior surface has at least one of at least a square centimeter of area or all of an area thereof having fewer than ten surface defects from adhesion or abrasion with a dimension greater than five micrometers and maximum depth of 50 nm relative to adjoining portions of the exterior surface facing away from the first major surface.

7. The coated glass article of claim 6, wherein the coating material and the glass material are such that diffusion of the coating material into the glass material to a depth of greater than 50 nm, without cracking the glass material, requires heating the glass material to at least a glass transition temperature of the glass.

8. The coated glass article of claim 6, wherein the coating material comprises lithium or copper and the glass material comprises a soda lime glass.

9. The coated glass article of claim 6, wherein the coating layer has a thickness of 1 nm to 1000 nm extending from the first major surface away from the diffusion zone.

\* \* \* \* \*